United States Patent
Bhatia

(10) Patent No.: US 12,402,681 B2
(45) Date of Patent: Sep. 2, 2025

(54) TAILORING PLATFORM

(71) Applicant: Sanjay Bhatia, Fort Lauderdale, FL (US)

(72) Inventor: Sanjay Bhatia, Fort Lauderdale, FL (US)

(\*) Notice: Subject to any disclaimer, the term of this patent is extended or adjusted under 35 U.S.C. 154(b) by 379 days.

(21) Appl. No.: 18/093,851

(22) Filed: Jan. 6, 2023

(65) Prior Publication Data

US 2023/0210208 A1  Jul. 6, 2023

Related U.S. Application Data

(60) Provisional application No. 63/296,944, filed on Jan. 6, 2022.

(51) Int. Cl.
| | | |
|---|---|---|
| *A41H 1/02* | (2006.01) | |
| *G01S 17/89* | (2020.01) | |
| *G06T 7/593* | (2017.01) | |

(52) U.S. Cl.
CPC ............... *A41H 1/02* (2013.01); *G01S 17/89* (2013.01); *G06T 7/593* (2017.01); *G06T 2207/10028* (2013.01); *G06T 2207/30196* (2013.01)

(58) Field of Classification Search
CPC . A41H 1/02; G06T 7/593; G06T 2207/10028; G06T 2207/30196; G01S 17/89
See application file for complete search history.

(56) References Cited

U.S. PATENT DOCUMENTS

| | | | | |
|---|---|---|---|---|
| 10,002,460 | B2* | 6/2018 | Black | G06Q 30/0601 |
| 10,217,293 | B2* | 2/2019 | Xiao | G06T 17/00 |
| 11,443,480 | B2* | 9/2022 | Fedyukov | G06T 19/20 |
| 11,461,914 | B2* | 10/2022 | Kämäräinen | A61B 5/1077 |
| 11,640,695 | B2* | 5/2023 | Stuyck | G06V 40/107 |
| | | | | 345/419 |
| 11,776,147 | B2* | 10/2023 | Bleicher | G06T 7/62 |
| | | | | 345/423 |
| 12,039,657 | B2* | 7/2024 | Wang | G06N 3/048 |
| 2023/0104072 | A1* | 4/2023 | Terry | G06T 19/20 |
| | | | | 705/26.7 |

\* cited by examiner

*Primary Examiner* — Gregory M Desire
(74) *Attorney, Agent, or Firm* — Clements Bernard Walker; Christopher L. Bernard; Devin Cummins

(57) ABSTRACT

Embodiments generally relate to a tailoring platform. In some embodiments, a method includes scanning a body of a user using a camera device, where the scanning captures images of the body from a predetermined pattern of perspectives. The method further includes computing one or more depth maps of the body based on the movement of the camera device. The method further includes constructing a three-dimensional (3D) point cloud that models the body based at least in part on the one or more depth maps. The method further includes identifying candidate garments for the user based on the 3D point cloud and one or more garment selection policies.

20 Claims, 19 Drawing Sheets

DRESS/SHIRT MEASUREMENT CHART

1. NECK
2. OVER BUST
3. BUST
4. UNDER BUST
5. WAIST
6. HIPS
7. NECK TO HEEL
8. NECK TO ABOVE HEEL
9. ABOVE KNEE TO ANKLE
10. ARM LENGTH
11. SHOULDER SEAM
12. ARM HOLE
13. BICEP
14. FORE ARM
15. WRIST
16. V NECK CUT
17. SHOULDER TO WAIST
18. WAIST TO ABOVE KNEE

FIG. 9

CHOOSE A SIZE BASED ON THE UNDERBUST MEASUREMENT!

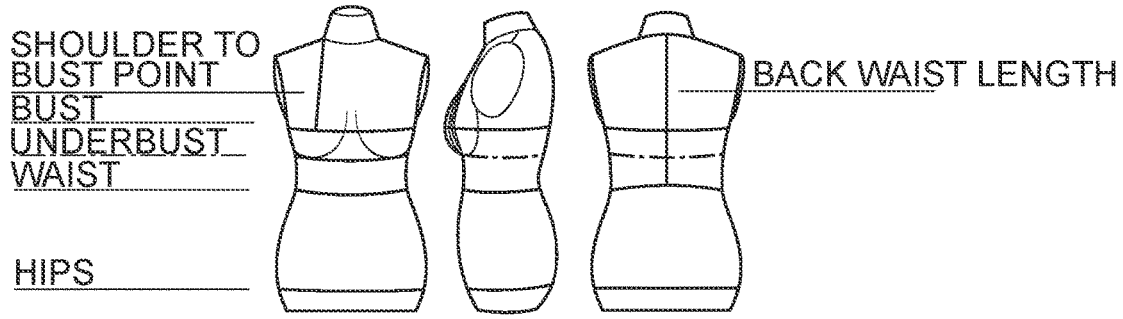

| UNDERBUST: | CM | INCH |
|---|---|---|
| SIZE 2 | 68 | 26 3/4 |
| SIZE 4 | 71.6 | 28 3/16 |
| SIZE 6 | 75.2 | 29 5/8 |
| SIZE 8 | 79 | 31 1/8 |
| SIZE 10 | 82.8 | 32 5/8 |
| SIZE 12 | 86.6 | 34 1/16 |
| SIZE 14 | 90.4 | 35 9/16 |
| SIZE 16 | 94.2 | 37 1/16 |
| SIZE 18 | 98 | 38 9/16 |
| SIZE 20 | 101.8 | 40 1/16 |
| SIZE 22 | 105.6 | 41 13/16 |
| SIZE 24 | 109.4 | 43 1/16 |

4 BUST OPTIONS

& DETAILED INSTRUCTIONS TO CUSTOMIZE THE WAIST, HIPS, BACK WAIST LENGTH & SHOULDER TO BUST POINT

| DRESS FORM MEASUREMENTS: | EUR UK US | 46 18 16 | | SHOULDER TO BUST POINT | |
|---|---|---|---|---|---|
| | | CM | INCH | CM | INCH |
| BUST A | | 108.5 | 42 3/4 | 30.9 | 12 3/16 |
| BUST B | | 113.2 | 44 9/16 | 31.5 | 12 3/8 |
| BUST C | | 117.9 | 46 7/16 | 32.5 | 12 13/16 |
| BUST D | | 122.6 | 48 1/4 | 33.5 | 13 3/16 |
| UNDERBUST | | 94.2 | 37 1/16 | | |
| WAIST | | 89 | 35 1/16 | | |
| HIPS | | 112 | 44 1/16 | | |
| BACK WAIST LENGTH | | 39.5 | 15 9/16 | | |

*FIG. 10*

TAILORING PLATFORM

CROSS-REFERENCE TO RELATED APPLICATION

The present disclosure claims the benefit of priority of co-pending U.S. Provisional Patent Application No. 63/296,944, filed on Jan. 6, 2022, and entitled "TAILORING APPLICATION," the contents of which are incorporated in full by reference herein.

INTRODUCTION

The present disclosure relates generally to artificial intelligence (AI) and object scanning, and specifically body scanning. More particularly, the present disclosure relates to systems and methods for implementing a tailoring platform.

The use of body scanning to generate an avatar has many uses such as garment fitting and digital gaming. While numerous body scanning systems exist that can generate an avatar, they have significant disadvantages in terms of performance, privacy, and compliance. For example, scanning applications result in a large amount of sensitive user information being uploaded to the cloud. When sensitive user information including photography is recorded and uploaded or stored in the cloud, it produces a great privacy and security risk to users. Also, existing scanning systems rely on limited graphics processing unit (GPU) resources on the cloud, resulting in limited usability and substandard performance.

The present introduction is provided as background context only and is not intended to be limiting in any manner. It will be readily apparent to those of ordinary skill in the art that the concepts and principles of the present disclosure may be implemented in other applications and contexts equally.

SUMMARY

The present disclosure relates to systems and methods for implementing a tailoring application. More specifically, the present disclosure provides a tailoring platform and application that enables and facilitates a system for scanning and measuring a user's body in order to generate sizing and garment recommendations in an accurate, effective, and a secure way. For example, with regard to privacy and compliance, the system of the tailoring platform performs implementations described herein without any user data being uploaded to the internet or cloud, thereby resulting in no sensitive or personal data being insecurely stored on the cloud. With regard to usability and performance, the system of the tailoring platform utilizes depth sensors, as well as other sensors such as LiDAR sensors, and artificial intelligence (AI) neural engines to enable processes described herein to be performed on a user device rather than having to upload large amounts of sensitive information to the cloud for processing.

In one illustrative embodiment, the present disclosure provides a system that includes one or more processors, and logic encoded in one or more non-transitory computer-readable storage media for execution by the one or more processors. When executed, the logic is operable to cause the one or more processors to perform operations including: scanning a body of a user using a camera device, where the scanning captures images of the body from a predetermined pattern of perspectives; computing one or more depth maps of the body based on movement of the camera device; constructing a three-dimensional (3D) point cloud that models the body based at least in part on the one or more depth maps; and identifying candidate garments for the user based on the 3D point cloud and one or more garment selection policies. In some aspects, the predetermined pattern of perspectives includes a circular pattern. The logic when executed is further operable to cause the one or more processors to perform operations including generating the one or more depth maps of the body using light detection and ranging (LiDAR). The logic when executed is further operable to cause the one or more processors to perform operations including generating the one or more depth maps of the body using dual cameras of the camera device. The logic when executed is further operable to cause the one or more processors to perform operations including discarding the images after a predetermined moment based on one or more privacy policies. The logic when executed is further operable to cause the one or more processors to perform operations including: generating silhouettes of the body based on the 3D point cloud; and predicting core measurements of the user based on the silhouettes. The logic when executed is further operable to cause the one or more processors to perform operations including generating a neural radiance field (NERF) model based on the images of the body captured by the scanning, and where the constructing of the 3D point cloud that models the body is based at least in part on the NERF model.

In another illustrative embodiment, the present disclosure provides a non-transitory computer-readable storage medium with program instructions stored thereon. The program instructions when executed by one or more processors are operable to cause the one or more processors to perform operations including: scanning a body of a user using a camera device, where the scanning captures images of the body from a predetermined pattern of perspectives; computing one or more depth maps of the body based on movement of the camera device; constructing a three-dimensional (3D) point cloud that models the body based at least in part on the one or more depth maps; and identifying candidate garments for the user based on the 3D point cloud and one or more garment selection policies. In some aspects, the predetermined pattern of perspectives include a circular pattern. The instructions when executed are further operable to cause the one or more processors to perform operations including generating the one or more depth maps of the body using light detection and ranging (LiDAR). The instructions when executed are further operable to cause the one or more processors to perform operations including generating the one or more depth maps of the body using dual cameras of the camera device. The instructions when executed are further operable to cause the one or more processors to perform operations including discarding the images after a predetermined moment based on one or more privacy policies. The instructions when executed are further operable to cause the one or more processors to perform operations including: generating silhouettes of the body based on the 3D point cloud; and predicting core measurements of the user based on the silhouettes. The instructions when executed are further operable to cause the one or more processors to perform operations including generating a neural radiance field (NERF) model based on the images of the body captured by the scanning, and where the constructing of the 3D point cloud that models the body is based at least in part on the NERF model.

In a further illustrative embodiment, the present disclosure provides a computer-implemented method including: scanning a body of a user using a camera device, where the scanning captures images of the body from a predetermined pattern of perspectives; computing one or more depth maps of the body based on movement of the camera device; constructing a three-dimensional (3D) point cloud that models the body based at least in part on the one or more depth maps; and identifying candidate garments for the user based on the 3D point cloud and one or more garment selection policies. In some aspects, the predetermined pattern of perspectives includes a circular pattern. The method further includes generating the one or more depth maps of the body using light detection and ranging (LiDAR). The method further includes generating the one or more depth maps of the body using dual cameras of the camera device. The method further includes discarding the images after a predetermined moment based on one or more privacy policies. The method further includes: generating silhouettes of the body based on the 3D point cloud; and predicting core measurements of the user based on the silhouettes.

BRIEF DESCRIPTION OF THE DRAWINGS

The present disclosure is illustrated and described with reference to the various drawings, in which like reference numbers are used to denote like system components and/or method steps, as appropriate.

FIG. 9 is a diagram of one illustrative embodiment of example measurement specification worksheet.

FIG. 10 is a diagram of one illustrative embodiment of example measurement selection worksheet.

Figure 1:
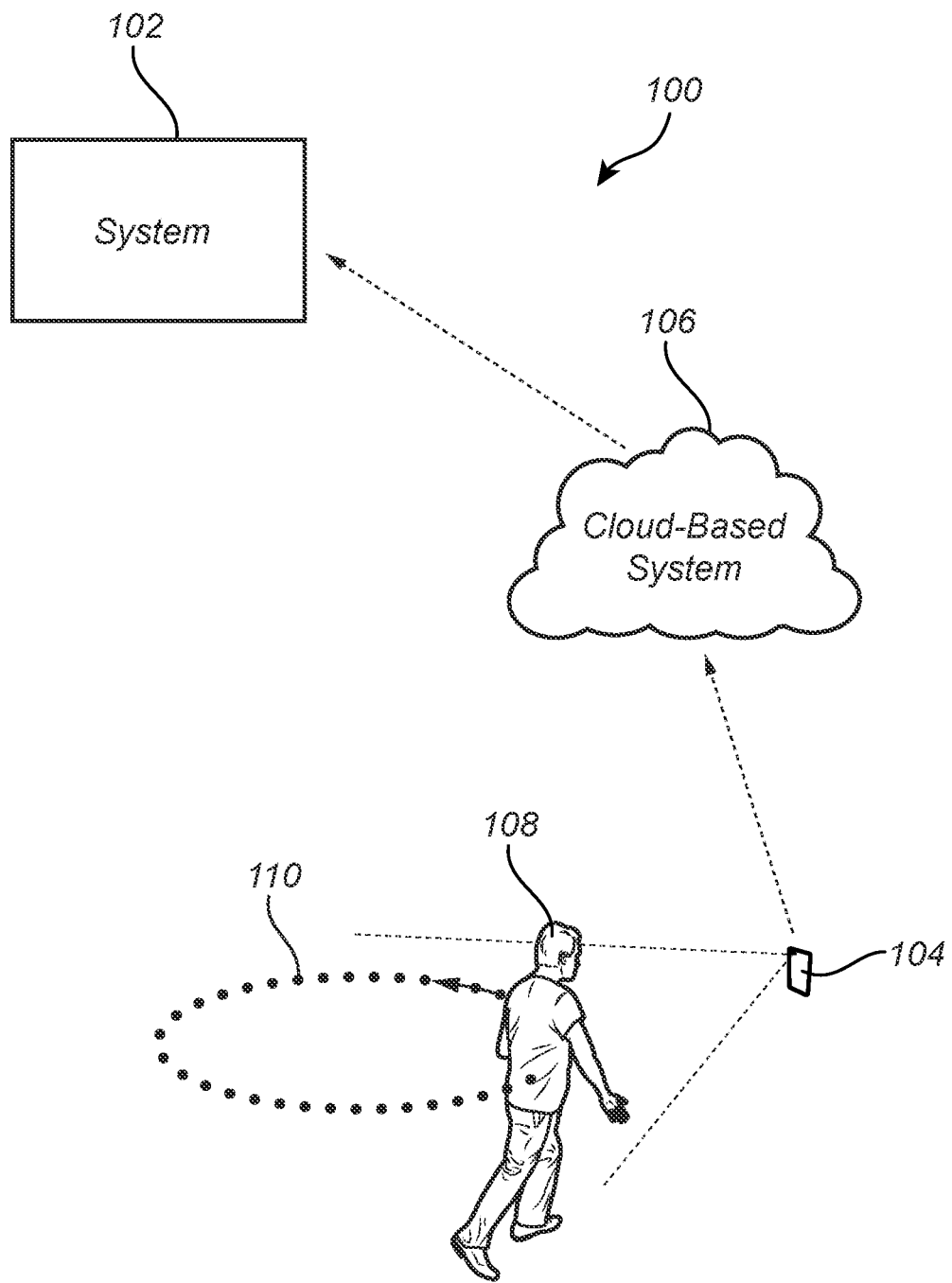
FIG. 1 is a block diagram of one illustrative embodiment of an example environment for implementing a tailoring platform.

All figures are shown with appropriate transparency to reveal internal structures, where helpful.

DETAILED DESCRIPTION

As described in more detail herein, the present disclosure relates to systems and methods for implementing a tailoring platform. The world is increasingly moving to mobile commerce as the primary way consumers purchase products, particularly for apparel purchases. The same devices used for making purchases online also need to be used to scan and measure the users' bodies in order to generate sizing recommendations in an accurate, effective and, most importantly, secure way. While numerous body scanning systems exist that can generate an avatar, they have significant disadvantages in terms of privacy, compliance, usability, and performance.

Embodiments described herein address these issues by providing a tailoring platform and application that enables a system to implement a body scan to determine optimal garment sizes as well as candidate garments for a user based on measurements computed by the system. With regard to privacy and compliance, the system of the tailoring platform performs implementations described herein without any user data being uploaded to the internet, thereby resulting in no sensitive or personal data being insecurely stored on the cloud. In other words, processes involving sensitive information of the user are performed by software of the tailoring platform that resides on the camera device (client-side). With regard to usability and performance, the system of the tailoring platform utilizes depth sensors, as well as other sensors such as LiDAR sensors, and artificial intelligence (AI) neural engines to enable processes described herein to be performed on a user device rather than having to upload large amounts of sensitive information to the cloud for processing.

In various embodiments, a system includes scanning a body of a user utilizing a camera device, where the scanning captures images of the body from a predetermined pattern of perspectives. The system further computes one or more depth maps of the body based on the movement of the camera device. The system further constructs a three-dimensional (3D) point cloud that models the body based at least in part on the one or more depth maps. The system further identifies candidate garments for the user based on the 3D point cloud and one or more garment selection policies.

It will be appreciated that the tailoring platform and application of the present disclosure may be used to scan and accurately measure all human bodies independent of age, gender, body type, race, or augmentation. Also, the avatar may be utilized for any purpose including garment fitting, digital games, social media, and others of the like. With regard to garment fitting, the avatar may also be used for different types of wearable items such as hats, shoes, etc.

While current compliance regulations and technical capabilities do not currently consider a color-less point cloud as personally identifiable information (PII), both technologies and regulations may evolve.

To maximize user privacy, the present disclosure immediately removes the head from the avatar as it is not needed for sizing apparel or measuring the body. The middle neck is kept to provide measurements for garments like men's shirts.

To remove the head, its position on the avatar is found as a first step. This is done by taking horizontal slices in 3D space and then calculating the surface area for each slice. Iteration is performed from top to bottom and the delta is measured between each slice. Proceeding below the head, the delta values will be positive and at some point start becoming negative. After this negative phase, when the values become positive again (the neck turns into the shoulders), the middle of the neck is determined and a 3D crop of the section at this level is done.

The head, which contains the face, is discarded so as to maximize privacy. Alternatively, we also use a supervised learning model by providing hundreds of examples of neck locations to an artificial neural network and optimize it with genetic algorithms with a NEAT framework.

FIG. 1 is a block diagram of one illustrative embodiment of an example environment 100 for implementing a tailoring platform. In various embodiments, environment 100 includes a system 102 and a client device or camera device 104. Environment 100 also includes a cloud-based system 106 through which system 102 and camera device 104 communicate. Cloud-based system 106 may include any suitable communication network such as a Bluetooth network, a Wi-Fi network, etc. As indicated, system performs implementations described herein without any user data being uploaded to the internet, thereby resulting in no sensitive or personal data being insecurely stored on the cloud.

As described in more detail herein, the system 102 receives multiple images from the camera device 104, where the camera device 104 scans the body of a user 108. In various embodiments, the camera device 104 may be a time-of-flight (ToF) device. As indicated above, the camera device may be equipped with depth sensors, as well as with other sensors such as light detection and ranging light detection and ranging (LiDAR) sensor, an infra-red (IR) sensor, and/or other depth sensors, or the like. The system 102 generates one or more depth maps or depth matrices of the user and stitches them together in three-dimensional (3D) space to create an avatar, generated as a 3D point cloud of the user's body. Further example embodiments directed to a camera device and associated depth sensors and depth maps are described in more detail below in connection with FIG. 2, for example.

In various embodiments, the system slices the 3D point cloud into silhouettes to identify locations of important body landmarks. The system takes measurements of portions of the body based on the body landmarks. The system further utilizes these landmark locations and associated measurements to identify candidate garments for the user based on one or more garment selection policies. For example, one or more garment selection policies may cause the system to utilize the landmark locations and associated measurements to filter out garments that would not fit the body of the user. The system may utilize a trained machine learning model and a database of existing measurements to predict a probability score of garments fitting the user. One or more garment selection policies may cause the system to identify garments that would most likely fit the body of the user. Further example embodiments directed to the tailoring platform and the system 102 are described in more detail herein.

For ease of illustration, FIG. 1 shows one block for each of system 102, camera device 104, and cloud-based system 106. Blocks 102, 104, and 106 may represent multiple systems, camera devices, and cloud-based systems. Also, there may be any number of users and corresponding camera devices. In other embodiments, environment 100 may not have all of the components shown and/or may have other elements including other types of elements instead of, or in addition to, those shown herein.

While the system 102 performs embodiments described herein, in other embodiments, any suitable component or combination of components associated with the system 102 or any suitable processor or processors associated with the system 102 may facilitate performing the embodiments described herein. For example, software associated with the tailoring platform and for executing implementations described herein may reside on the system 102 (e.g., server-side) and on the camera device 104 (e.g., client-side).

Figure 2:
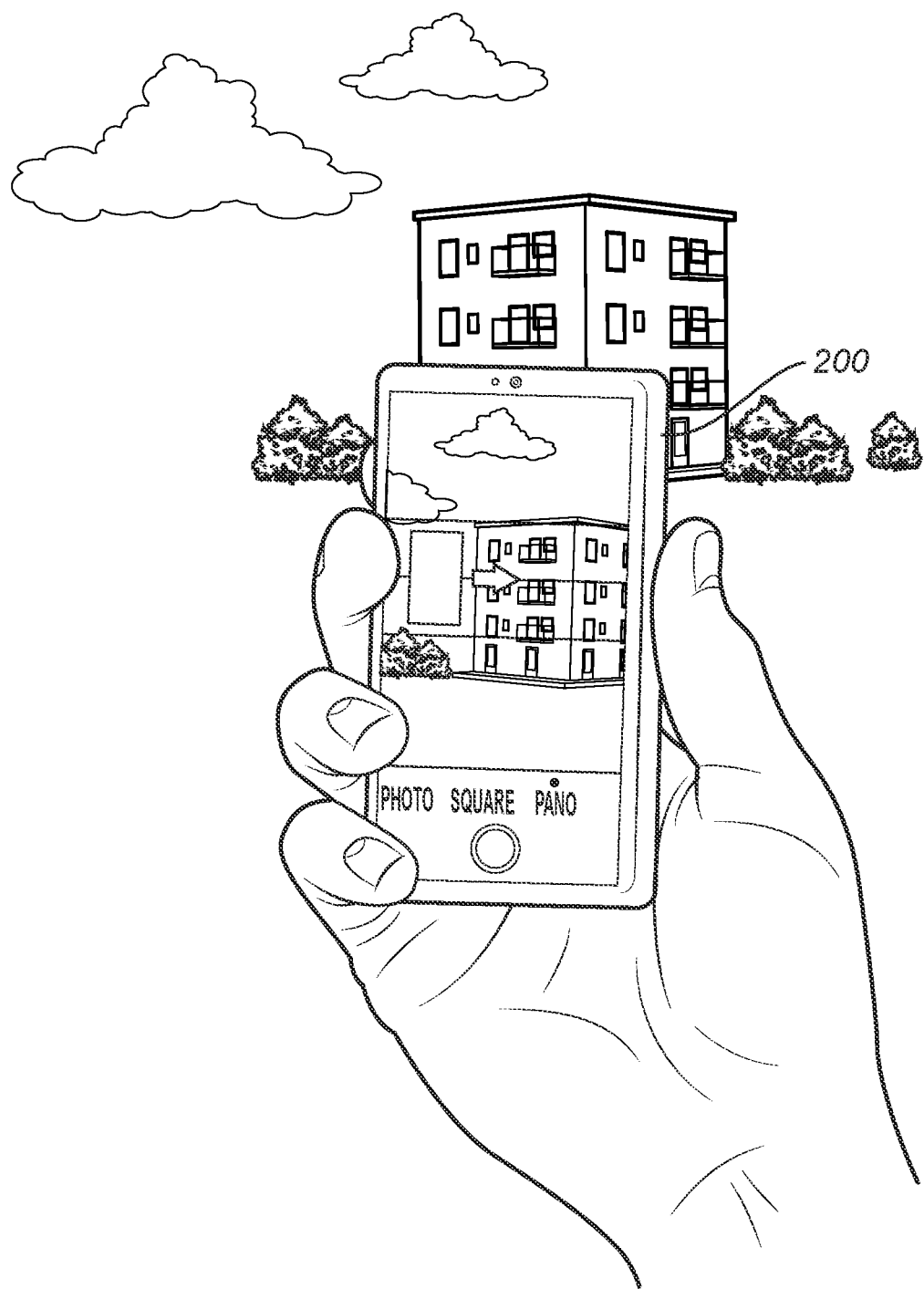
FIG. 2 is a block diagram of one illustrative embodiment of an example camera device for scanning the body of the user when implementing the tailoring platform.

FIG. 2 is a block diagram of one illustrative embodiment of an example camera device 200 for scanning the body of the user 108 when implementing the tailoring platform. The camera device 200 may be integrated into a smartphone as shown and used to implement the camera device 104 of FIG. 1.

The camera device 200 may be used to implement the camera device 104 of FIG. 1, and other camera devices described herein. In various embodiments, the camera device is equipped with depth sensors which capture depth maps of the user's body. As described in more detail herein, the system generates an accurate avatar of the torso or full body of the user based on the depth maps, which are used to digitally measure portions of the user's body. The system acquires these depth maps from multiple angles in order to capture every part of the body of the user. The system may use a single depth map to analyze at least half the body. The system may use additional depth maps to analyze more aspects of the body such as the front and back of the body. The system may utilize multiple different depth maps to stitch together a model of the body in an accurate manner. In various scenarios, the system utilizes at least one depth map from the front and one side to construct a model of the body. While one side may be mirrored to approximate two or more side perspectives, the more depth maps that the system captures, the more accurate the system will be for measuring body parts for garments.

In various embodiments, the system may use various scanning techniques for capturing an image of the body of the user. Such techniques my involve a human camera operator or using a "360 photo booth" that spins around the body of the user while scanning. Photos are taken in a circular motion at small angle increments (perhaps one per degree of rotation) around the subject's body by a camera device such as the camera device 200 and the like. The camera device 200 may scan the body of the user using one or more depth sensor devices that record multiple photos with depth map data. Such a depth sensor device may be integrated into a smartphone, a motion sensing input device, or other time-of-flight sensor device, etc.

In some implementations, a 3D photo booth mechanism or mechanical arm may be used to spin or revolve a camera device around the subject user. As such, the camera device may capture images of the body of the user at a constant speed taking 360 photographs (e.g., one photograph for every degree of rotation, etc.). The tailoring system will work with high accuracy if not perfect accuracy with far fewer depth maps with more images captured. The system may achieve a good balance between performance and accuracy, as the more images captured the more data that would need to be processed.

The system may provide guides to human operators similar to the panorama mode of a smartphone application. The system may provide speed and angle information to the user. For example, the system may warn the user if they move too fast, too slow, or should change the tilt on the camera, etc. The system may use a camera device that includes a gyroscope and/or an accelerometer that are used to measure the position of the camera in 3D space.

As described herein, the camera device may use these positioning measurements and other types of measurements depth map information described herein to reconstruct points in 3D space.

In various embodiments, the system utilizes artificial intelligence (AI) to carry out various embodiments described herein in connection with the tailoring platform, including steps described below in association with FIG. 3. Example embodiments directed to AI, and the training of AI are described in more detail below in connection with FIGS. 11 to 15 and associated descriptions.

Figure 3:
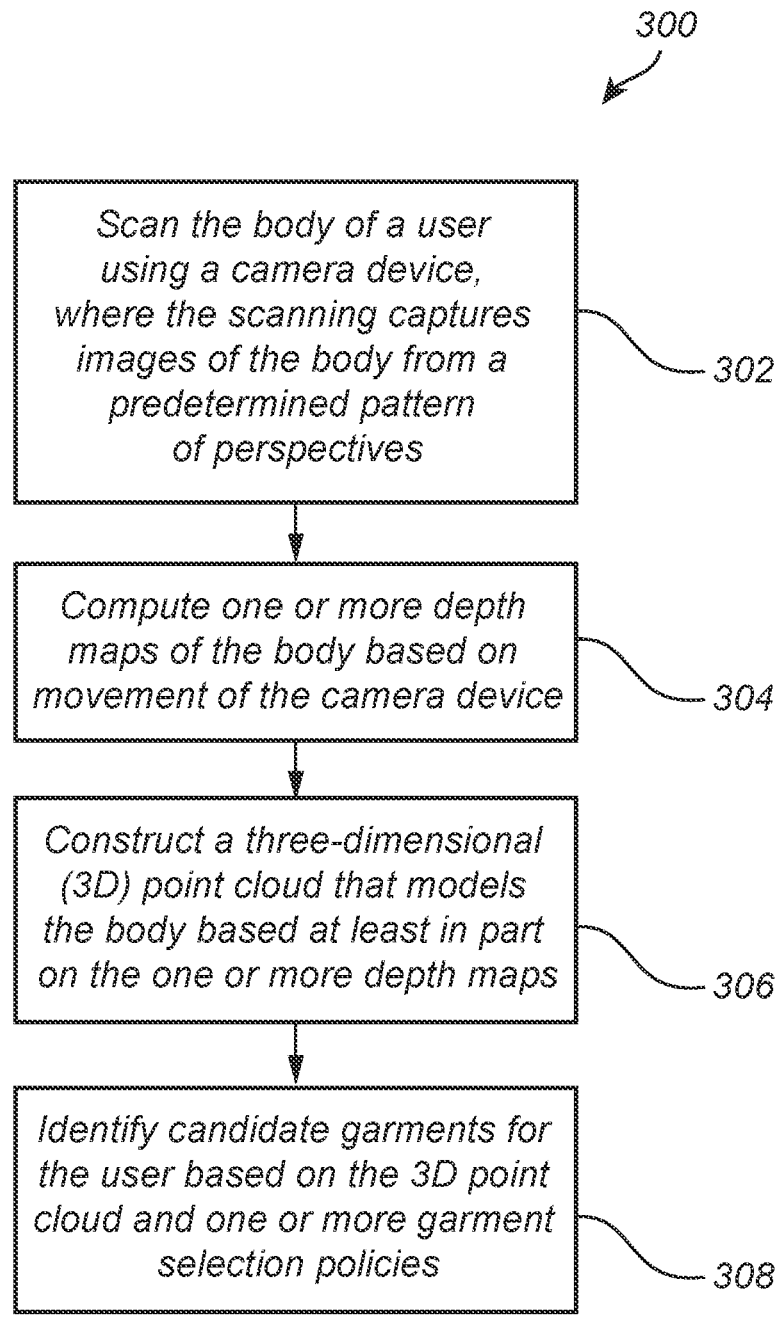
FIG. 3 is an example flow diagram of one illustrative embodiment for implementing a tailoring platform.

FIG. 3 is an example flow diagram 300 of one illustrative embodiment for implementing a tailoring platform. Referring to both FIGS. 1 and 3, a method is initiated at block 302, where a system such as the system 102 scans the body of the user 108 using a camera device such as the camera device 104. As indicated herein, in various embodiments, the camera device 104 may be a time-of-flight (ToF) device or other devices such as those described above that include depth sensors.

In various embodiments, the scanning captures images of the body from a predetermined pattern of perspectives. For example, in various embodiments, the predetermined pattern of perspectives includes a circular pattern such as the circular pattern 110 shown in FIG. 1. As described herein, in various embodiments, the camera device 104 may be a 3D photo booth device that revolves around the body of the user 108. In another example, the camera device 104 may be a camera device that is integrated into a smartphone such as the camera device 200 of FIG. 2.

In various embodiments, the system may guide a photographer operating the camera device 104 as the photographer walks around the user 108. For example, the system may display visual and/or auditory guidance via the camera device 104 as the photographer walks around the user 108. Such guidance may include feedback on the position of the camera device 106 such as the distance or proximity of the camera device 106 to the user 108. Such guidance may also include feedback on the speed at which the camera device 106 revolves around the user 108. The particular guidance may vary, and will depend on the particular implementation.

At block 304, the system 102 computes one or more depth maps of the body based on the movement of the camera device. As described in various embodiments herein, the system may generate such depth maps of the body at the camera device without the need to send images to the cloud, thereby providing secure processing and privacy for the user. Example embodiments directed to security and privacy are described in more detail below.

Figure 4:
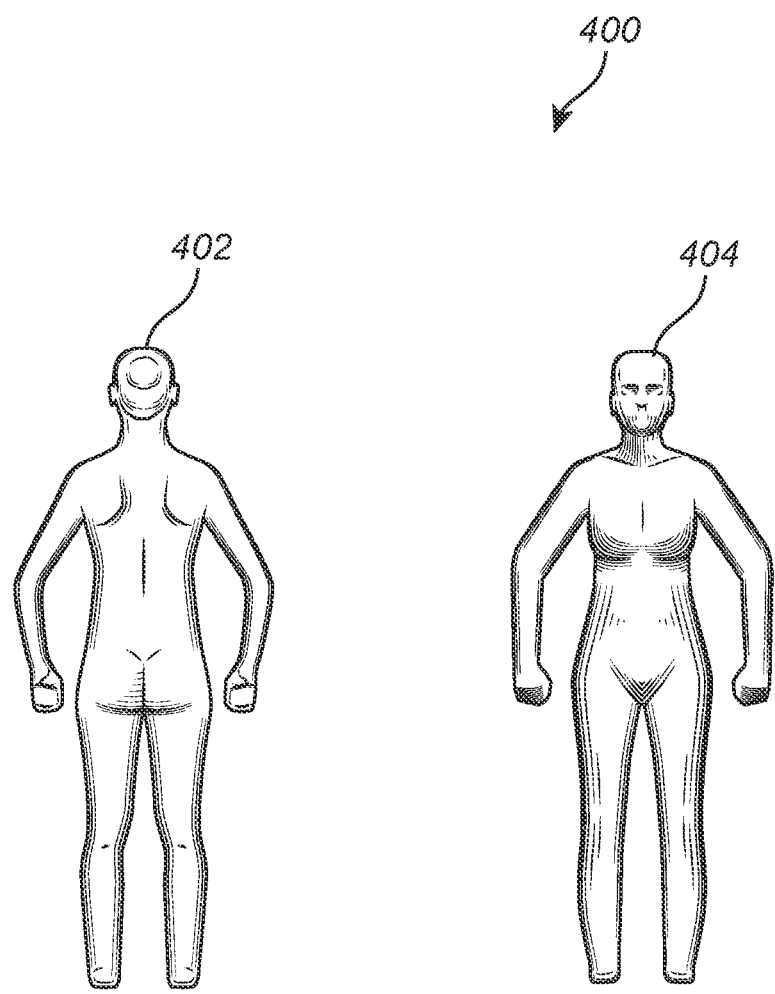
FIG. 4 is a diagram of one illustrative embodiment of an example depth map.

FIG. 4 is a diagram of one illustrative embodiment of an example depth map 400. Shown are a back view 402 of a user and a front view 404 of the user. The user shown may represent the user 108 of FIG. 1.

In various embodiments, the system generates the one or more depth maps of the body using one or more depth sensors of the camera device. In some embodiments, the capturing of the depth maps is based on scanning the body of the user using at least two different types of depth sensors. There are a number of modern devices that utilize time of flight to calculate depth maps. Such examples include iPhone Pro Lidar Sensor, Facetime Sensor, Microsoft Kinnect Sensors, and various third-party sensors.

The following are examples of software used for capturing 2D depth maps. Software development kits (SDKits) such as Unity, Unreal Engine, ARKit may be used in languages such as C #, Objective C or Swift to capture 2D depth maps from the device. Further example embodiments directed to 2D depth maps are described in more detail herein. The following is an example pseudo code associated with 2D depth maps:
func captureDepthMap(lidarDepthSensor: LidarDepthSensor)->DepthMap {let depthMap=DepthMap( ) let laserScan=lidarDepthSensor.getLaserScan( ) for scanPoint in laserScan.points {let x=scanPoint.x let y=scanPoint.y let z=scanPoint.z depthMap.addPoint(x: x, y: y, z: z)} return depthMap}

The depth map from these sensors offers only limited perspective into a consumer's body type and cannot be used for body measurement and garment size recommendation. To alleviate this situation and improve measurement accuracy, the system combines depth maps from different perspectives into a final point cloud. The system can use a minimum of two depth maps as a basic example.

As described in more detail herein, depth map information may include noise. As such, the system may discard larger depth values that represent walls and/or objects behind the subject's body. The system may oversample frames to find points that exist in multiple frames to identify patterns and overlap. Points that exist in only one frame are discarded as potential noise. These techniques improve the 3D point cloud generated by the system. Further example embodiments directed to the handling of noise and the use of depth maps for constructing 3D point clouds are described in more detail herein.

Multiple depth maps are taken for production use in order to properly eliminate sensor noise elements from key data points in order to maximize accuracy for highly precise sizing, where even a 1 cm difference can result in a false positive recommendation.

In various embodiments, the system generates the one or more depth maps of the body using LiDAR. In some embodiments, the capturing of the depth maps is based on scanning the body of the user using LiDAR. Various example embodiments directed to LiDAR are described in detail below.

In various embodiments, the system generates the one or more depth maps of the body using dual cameras of the camera device. As LiDAR and infrared sensors are not available in all devices, dual cameras including stereoscopic cameras may be used to generate or simulate depth maps. Such processes are similar to how the eyes and the brain of a small animal work. In various embodiments, if there is an overlapping section between the two images, objects further away seem as close to the camera device as objects positioned at a near distance to the camera device.

The system constructs a 3D image of the body and translates the 3D image to a depth map. In some scenarios, this process might not be as accurate when applied to areas with similar color or luminance yet this process avoids a possible risk of confusing the cameras. While many lower-cost devices contain double cameras, the more expensive depth sensors do not. In situations where no depth sensor is available, a simulated 3D depth map is generated.

As described in more detail herein, in some alternative embodiments, the system may generate a neural radiance field (NERF) model based on the images of the body captured by the scanning, where the system constructs a model of an avatar in the form of a 3D point cloud that models the body based at least in part on the NERF model.

The alternative NERF technique is beneficial in that it requires a vastly smaller library of apparel garment scans. Example embodiments directed to the NERF model are described in more detail below.

At block 306, the system 102 constructs a three-dimensional (3D) point cloud that models the body based at least in part on the one or more depth maps. In various embodiments, the system constructs or generates the 3D point cloud such that the 3D point cloud models the torso of the body or the full body of the user.

As described in more detail herein, the system generates an avatar as a 3D point cloud based on depth maps. To perform proper avatar point cloud generation, multiple point clouds are positioned into a 3D space. Data from the accelerometer and gyroscope is used to predict the position of the depth sensor in 3D space. Further example embodiments directed to avatars and 3D point clouds are described in more detail herein. The following is example pseudo code associated with avatars as a 3D point cloud based on depth maps:

```
// Get the motion manager let motionManager = CMMotionManager( )
// Get the accelerometer data if motionManager.isAccelerometerAvailable {
motionManager.startAccelerometerUpdates(to: .main) { (data, error) in guard let
accelData = data else { return } let accel = accelData.acceleration } }
// Get the gyroscope data if motionManager.isGyroAvailable {
motionManager.startGyroUpdates(to: .main) { (data, error) in guard let gyroData =
data else { return } let rotX = gyroData.rotationRate.x let rotY =
gyroData.rotationRate.y let rotZ = gyroData.rotationRate.z } }
```

The capture of additional data between frames allows for the estimation of the camera movement. In the case of using a 360-degree photo booth with smooth motion, if the system combines 60 depth maps and the apparatus does a complete circle in 10 seconds at a consistent speed, each capture will be exactly 6 degrees. In a scenario where the system captures the object in a circular motion, the system uses such details to position each frame in 3D space.

In the more complex example of a human camera operator, neither speed nor movement is guaranteed to remain constant. To deal with the randomness of the imperfect movement from the human operator, we compensate for it with the movement detected by the gyroscope and the accelerometer between frames. Thanks to the incredible precision these sensors provide, we can accurately capture enough 2D depth maps and know their orientation in order to reconstruct a point cloud.

At block 308, the system 102 identifies candidate garments for the user based on the 3D point cloud and one or more garment selection policies. As described in more detail below in connection with FIG. 5, the system generates an avatar of the body of the user as the 3D point cloud. The system applies various candidate garments for the user based on the 3D point cloud. The system filters out particular garments that are unlikely candidates for the user, and identifies candidate garments for the user to select. As described in more detail below, the system identifies various candidate garments and presents such garments to the user based on various garment selection policies. Further example embodiments directed to these and other steps are described in more detail herein.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Embodiments described provide various benefits to the user, including benefits directed to privacy and performance. With regard to privacy, the system of the tailoring platform utilizes device hardware to construct a full 3D point cloud while also ensuring the security and privacy of the user based on one or more of such privacy policies. For example, in some embodiments, at least one privacy policy requires that the system discards the images after a predetermined moment. The moment may be for example, when the system computes one or more depth maps of the body of the user. The system may proceed to generate a 3D point cloud based on the depth maps, after which point the system no longer requires the images. As such, the system may store the images temporarily in device memory (e.g., the memory of the camera device), over which the user has control.

In another example embodiment, at least one privacy policy requires that the system prevents all images from portions of the tailoring process. For example, because the system does not require images after the depth maps are computed, the system may prevent the images from being processed thereafter, including transmitting the images to the cloud. As such, the system protects potentially sensitive photographs of the user (e.g., the user wearing minimal clothing for a scan, etc.). In another example embodiment, at least one privacy policy requires that the system prevents all user-identifying information from being sent to the internet, thereby satisfying general data protection regulation (GDPR) compliance. In another example embodiment, at least one privacy policy requires that the system generates an avatar and immediately obtains user verification upon making the avatar available to the user.

These privacy policies enable the tailoring platform to provide enhanced performance of the tailoring platform. For example, the system is enabled to support a large number of users simultaneously, because the system does not depend on limited GPU resources in the cloud resulting from infinite scalability. In various embodiments, the system utilizes the camera device's GPU capabilities, thus keeping all of the computing local and allowing the system to be infinitely scalable as opposed to utilizing cloud-based GPU resources. The system is also interactive, allowing the user to be notified immediately if any problem arises, eliminating the need to wait for feedback after the process has been completed. By keeping all of the user data local to the camera device of the user, no user data is sent to external servers on a cloud-based system. This ensures that no personal or sensitive data is stored external to the user's device thereby keeping the data secured.

Again, while current compliance regulations and technical capabilities do not currently consider a color-less point cloud as personally identifiable information (PII), both technologies and regulations may evolve.

To maximize user privacy, the present disclosure immediately removes the head from the avatar as it is not needed for sizing apparel or measuring the body. The middle neck is kept to provide measurements for garments like men's shirts.

To remove the head, its position on the avatar is found as a first step. This is done by taking horizontal slices in 3D space and then calculating the surface area for each slice. Iteration is performed from top to bottom and the delta is measured between each slice. Proceeding below the head, the delta values will be positive and at some point start becoming negative. After this negative phase, when the values become positive again (the neck turns into the shoulders), the middle of the neck is determined and a 3D crop of the section at this level is done.

The head, which contains the face, is discarded so as to maximize privacy. Alternatively, we also use a supervised learning model by providing hundreds of examples of neck locations to an artificial neural network and optimize it with genetic algorithms with a NEAT framework.

Figure 5:
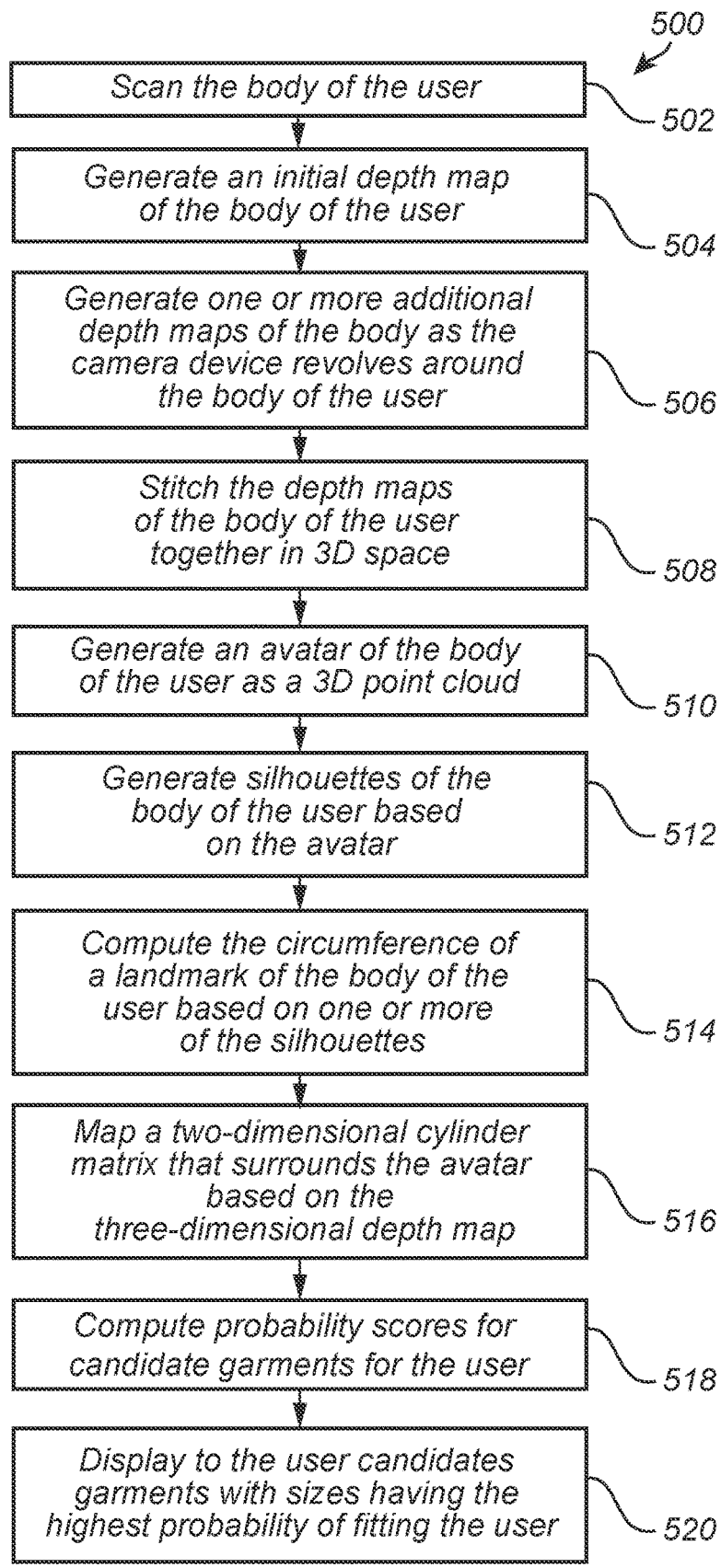
FIG. 5 is an example flow diagram of one illustrative embodiment for implementing a tailoring platform.

FIG. 5 is an example flow diagram 500 of one illustrative embodiment for implementing a tailoring platform. Referring to both FIGS. 1 and 5, a method is initiated at block 502, where a system such as system 102 utilizes the camera device 104 to scan the body of the user. As indicated herein, the camera device 104 may be a time-of-flight (ToF) device or camera device with one or more depth map sensors. Similar to other embodiments described herein, a user stands in front of the camera device equipped for a user. As indicated above, camera device 104 may be implemented with camera device 200 of FIG. 2 or the like.

At block 504, the system generates an initial depth map of the body of the user. In various embodiments, the system may use one or more depth sensors of the camera device 104 to generate a depth map or depth matrix of the body of the user from the images captured by the camera 104. Example embodiments directed to the generation of depth maps are described herein.

At block 506, the system generates one or more additional depth maps of the body as the camera device revolves around the body of the user. In various embodiments, as the camera device 104 revolves around the body of the user, the camera device 104 captures the entire surface of the body of the user. The system detects the gyroscopic movement and generates additional depth maps or depth matrices at a high frequency to gather enough depth map information to create a sufficiently detailed database. The system may handle sensor noise by comparing multiple frames to detect and mitigate any invalid points resulting from such sensor noise. For example, if the system detects points in a frame that do not appear in other frames from a similar perspective (e.g., view angle, etc.), the system removes the flawed points. The system may utilize an accelerometer, gyroscope, and/or depth sensor equipped on the camera device to ensure that the rotation around the body is smooth. The system may utilize these devices to detect when any problems arise in order to prevent defective scans. The system may provide indicators or display commands on the camera device to alert the user of any improper scanning speeds and angles for the user to make corrections.

At block 508, the system stitches the depth maps of the body of the user together in 3D space. The system may use any suitable means for stitching together the depth maps.

At block 510, the system generates an avatar of the body of the user as a 3D point cloud. The system may stitch together multiple depth maps in 3D space to generate the avatar as a 3D point cloud of the body of the user. In some embodiments, the system may construct a 3D point cloud that models the body based at least in part on segment measurements that the system computes based on the depth maps. For example, the system may determine segment length measurements using augmented reality skeleton techniques (e.g., ARKit, TensorFlow, etc.). The following is an example pseudo code for generating an avatar of the body as a 3D point cloud:

```
Initialize a 3D point cloud array 3D_point_cloud = [ ]
Iterate through all depth maps, FOR each depth map
  Get the camera angle for the depth map, camera_angle =
get_camera_angle(depth_map)
    Iterate through each pixel in the depth map, FOR each pixel in depth_map
      Get the pixel's x, y coordinates, pixel_x, pixel_y =
get_pixel_coordinates(pixel)
      Get the pixel's depth value, pixel_depth = get_pixel_depth(pixel)
      Calculate the 3D coordinates of the pixel, 3D_x, 3D_y, 3D_z =
calculate_3D_coordinates(pixel_x, pixel_y, pixel_depth, camera_angle)
      Add the 3D coordinates to the point cloud
```

At block 512, the system generates silhouettes of the body of the user based on the avatar. In other words, the system generates silhouettes of the body based on the 3D point cloud. In various embodiments, the system slices or shadows the avatar to obtain the silhouettes. The system uses the slices to identify height locations of important body landmarks like bust, waist, hips, etc. In various embodiments, the system uses a horizontal slice of the body to calculate the circumference of body parts at each landmark (e.g., bust, waist, hips, etc.). These landmark measurements are used to filter garments that would not fit the person in obvious ways.

Figure 6:
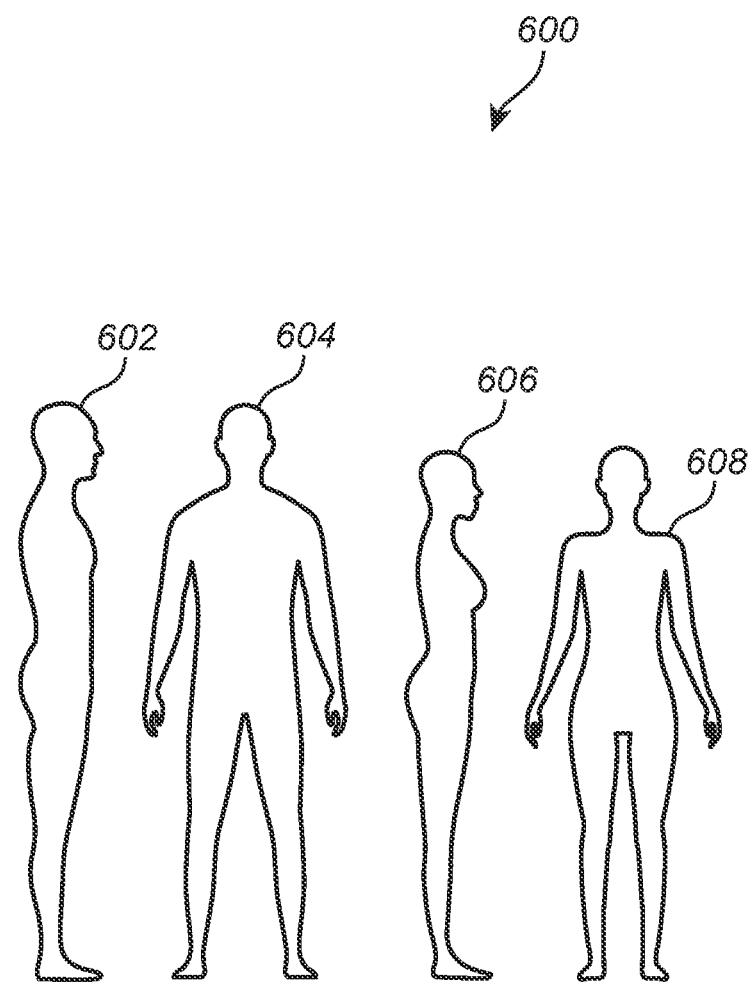
FIG. 6 is a diagram of one illustrative embodiment of example silhouettes.

FIG. 6 is a diagram of one illustrative embodiment of example silhouettes 600. Shown are example silhouettes of two users. Two silhouettes include a side view silhouette 602 and a back view silhouette 604 of a male user. Two silhouettes include a side view silhouette 606 and a back view silhouette 608 of a female user. These silhouettes are collectively referred to as silhouettes 600. Either of the users shown may represent the user 108 of FIG. 1.

At block 514, the system computes the circumference of a landmark of the body of the user based on one or more of the silhouettes. The system calculates the circumference of a landmark by using a horizontal slice of the body.

At block 516, the system maps a two-dimensional (2D) cylinder matrix that surrounds the avatar based on the 3D depth maps of the avatar. The system maps the avatar's 3D point cloud into a 2D cylinder matrix that surrounds the body of the user. The system may use an existing database of 2D cylinders to train a machine learning (ML) model as to what fits and does not fit different individuals for a type of garment. In some embodiments, the system may utilize neural networks on an altitude mercator projection versus matchmaking a digital twin. The system may use a gyroscope and/or an accelerometer to convert depth maps taken from a circular path (e.g., a panoramic image pointing at the body of the user while revolving around the body) in order to turn hundreds of depth maps into a 3D point cloud. Various example embodiments of AI training and ML techniques are described in more detail below in connection with FIGS. 11 to 15 and associated descriptions, for example.

At block 518, the system computes probability scores for candidate garments for the user. As described in more detail below, the system predicts core measurements of the user based on the silhouettes. In various embodiments, the system feeds the 2D cylinder matrix into an ML predictor to predict a probability score of garments fitting the individual. Conventional in-person tailoring involves utilizing a tape measure to measure curved areas of the body. Existing algorithmic methods of replicating these same measurements may work well with standardized body types but fail when confronted with the vast diversity of modern consumers and people of different shapes and sizes all around the world. Embodiments address this issue with a simplified algorithm training and a prediction process, where the system converts a 2D avatar to a 2D silhouette image. The system converts the 2D silhouette image into a matrix and uses the matrix for training a ML model to detect and measure landmarks. The system generates examples of silhouettes taking cross sections of the 3D point cloud from horizontal and vertical perspectives. The system makes accurate core measurements of a consumer's body commonly used in apparel fitting in order to narrow down the recommendations for the user effectively. Such recommendations include garments and sizes with the highest likelihood of being a good match for a given user.

In various embodiments, the core measurements constitute key data samples that provide the guidance necessary for a recommendation engine. To determine a consumer's accurate measurements, the neural network is trained on thousands of silhouette examples and their corresponding core measurements.

In some embodiments, a cross section of the 3D point cloud is taken to generate a silhouette that gets converted to two arrays. The first array contains a starting point and the second array contains the length of a body segment to the stopping point. The particular body segments may vary, depending on the particular implementation. For example, the body segments may include body parts (e.g., bust, waist, hips, etc.). In other examples, the body segments may include vertical slices or rows of the body of the user, etc. Other representations may be used to compress an image of a silhouette, which would typically consume over 1 megabyte of data with a resolution of 1024×1024 into two much smaller 1024-byte arrays.

In some embodiments, the system may remove the arms of the body of the user in order to ensure that each row of the image only has one start and one stop. The system may remove the arms of the body based on the requirements of the two arrays or double arrays described above. Arms may be removed by taking vertical slices of the image from the outside in then cropping the body as soon as more than one start a stop line is found. This process may then be repeated with the upper half of the body (e.g., for bodies with larger hips than waist. Once the vertical position of the arm is found the arm can be cropped out to simplify, etc.). The data structure that represents the silhouette may include data associated with a single start and stop position on each row, and such data for multiple rows.

In some embodiments, the system performs a differential analysis for candidate garments that probably would fit the user based on measurements described herein. The system may generate a 2D altitude map mercator projection from the 3D point cloud. The system generates a differential map or "diff" between the user and every size of every candidate garment available. The system may apply a binary classification neural network to these "diff" images in order to determine if the differences are appropriate or too great to qualify. The system discards unlikely garments.

In various embodiments, the system may generate a relative probability score indicated by a score between 0 and 100 for each candidate garment. The system may present the candidate garments with higher scores (e.g., scores above a predetermined upper threshold, etc.) to the user in an e-commerce experience. The system may also filter out garments with lower scores (e.g., scores above a predetermined lower threshold, etc.) as being unlikely to fit. Note that different sizes of different garments may have different high scores. For example, for a pair of men's shorts, the same person can be a size small in one style but a size medium in another style.

At block 520, the system displays to the user candidate garments with sizes having the highest probability of fitting the user. The system may show the user candidate garments and specific sizes with the highest probability of fitting the individual. As indicated herein, the entire process can be done without any user data being uploaded to the cloud or any other external system.

In various embodiments, the system may utilize a recommendation engine to make recommendations of candidate garments and associated sizes for the user. Once the trained models and apparel database are available, the system may utilize the predicted core body measurements and 3D point cloud to score the user against every size of garment in the database. A specific individual may generally wear a size medium in some styles and large in others. As such, the system may disregard the size label in lieu of the core measurements and 3D point cloud. In some scenarios, some available garments may be made of stretchable material or may be fashioned in a baggy style. As such, some types of garments may have a range of user measurements that would fit a user comfortably. The system would recommend sizes accordingly based on the style of the garments. Measurement accuracy achieved by the system is potentially greater than measurement results provided by a human tailor. Ultimately, the system collects and processes data for a perfect-fit model for each size of the candidate garments.

In various embodiments, the system hides garment products that the system deems unfit for the user. This is beneficial because it creates a more seamless and customized customer journey for the user. Another benefit is that the process eliminates the risk of fit-related returns, thereby increasing profitability and reducing the environmental impact of apparel shopping. In some embodiments, the system may display garments and corresponding sizes in a descending "best fit" order. In some embodiments, the system may identify some displayed garments that may be appropriate for the user based on the user's body type. For example, particular patterns (e.g., prints, stripes, etc.) may be more flattering for particular body types.

The system may utilize a garment database for making recommendations. In some embodiments, prior to providing recommendations on what candidate garments and sizes would likely fit the user, the system accesses a garment database of all garments available, all sizes available, core measurements of each size, and a sample body that showcases a proven high-quality fit in reality. This information and other associated information may be acquired via technical sheets and/or manufacturing instructions that a designer sends to a factory for producing different sizes of each garment.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

In various embodiments, the system generates a neural radiance field (NERF) model based on the images of the body captured by the scanning, and where the construction of the 3D point cloud that models the body is based at least in part on the NERF model. An alternative technique in the absence of depth sensors or a LiDAR scanner, the system may feed photographs into a neural radiance field to generate a 3D point cloud.

A neural radiance field is a type of generative model used for image synthesis. It works by generating a set of parameters used to create a realistic image from a given scene. The parameters are learned from a training set of images and is then used to generate a new image from a new scene. The parameters are typically generated using a convolutional neural network, and the generated image is a 3D sequence of pixel values. The neural radiance field is used to generate images in a variety of different styles, such as realistic photographs or abstract art. To implement a neural radiance field in detail, the system may enable a software developer to first create a convolution neural network that can learn the set of parameters from a training set of images. This is accomplished by building the convolutional layers, choosing the appropriate activation functions, and training the network on the data. Once the network is trained, the parameters are used to generate a new image from a given scene. We then define the 3D sequence of pixel values that are used to generate the image, and define the appropriate equations to generate the image using the parameters.

Using a NERF model, the system can function on far more limited data capture samples. A NERF model takes as few as two images and uses an artificial neural network to generate a 3D world, or NERF 3D world. The final NERF is able to convert two or more images into a 3D model. Once the NERF 3D world is generated on the camera device using an AI accelerator chip or GPU, the system may extract a 3D point cloud by using a cylinder-to-3D crop the user's body from a scene generated from photos of the body from different angles. A simple cylinder is then used to extract human geometry. The polygons and texture data are removed and converted to a 3D point cloud.

Additionally, the present disclosure includes various mechanisms to increase the quality of the scanning process, therefore increasing the quality of the avatar. For example, as indicated above, most sensing devices inherently include some form of sensor noise that may create static or invalid points. To manage this, the application compares multiple frames to remove any invalid points which may appear during the scan. For example, if a point appears in one frame but not others from a similar perspective, the system may flag it as an invalid point and proceed to remove the point.

Additionally, the user may introduce movement during the scan such as movement from breathing or moving. A resulting double layering may occur in the scan. The system detects such movement and can either remove the double layering, alert the user to perform a rescan, or alert the user to hold still for the remainder of the scan. Such alerts may include displaying instructional commands on the device to notify the user performing the scanning of improper scanning speeds and angles for the user to make corrections during the scanning process to ensure proper data collection.

In various embodiments, the system may utilize LiDAR sensors and AI neural engines already present on the camera device to execute embodiments described herein on the device alone. The system may perform all of the processing on the camera device itself, eliminating the need to send large amounts of data including images captured during the scan to the cloud for processing. In various embodiments, the system may utilize other depth sensors such as infrared (IR) sensors and the like for scanning. The system may utilize augmented reality and PoseNet type neural networks to determine the stance and posture of the body of the user and the angle to aid in the scanning process. Furthermore, the system may be used with a single user, where the device is in a fixed position to scan the single user. This enables such a user to be scanned without needing another person to operate the camera device. In this scenario, the user may rotate his or herself in front of the camera device to enable the camera device to scan the user's body from multiple perspectives.

Figure 7:
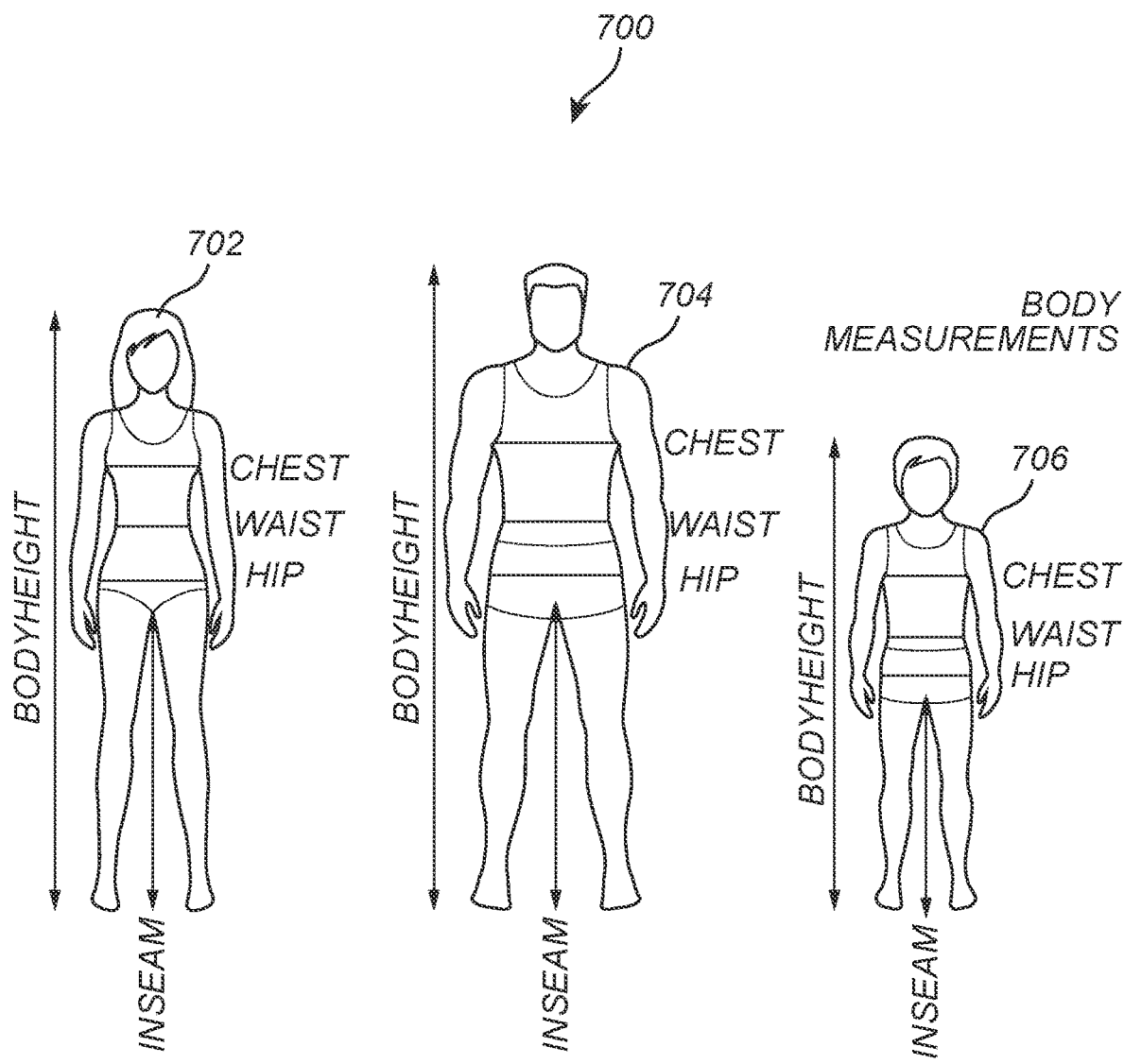
FIG. 7 is a diagram of one illustrative embodiment of example core body measurements.

FIG. 7 is a diagram of one illustrative embodiment of example core body measurements 700. Shown is a female user 702, male user 704, child user 706. In this example, the core body measurements include chest, waist, and hip measurements. Arrays of the core body measurements 700 corresponding to the female user 702, the male user 704, and the child user 706 are fed into a neural network for the training process. As a result, the system effectively predicts the core measurements of potentially any individual, provided that the training data sample is sufficiently comprehensive to cover a broad range of possible body types.

Figure 8:
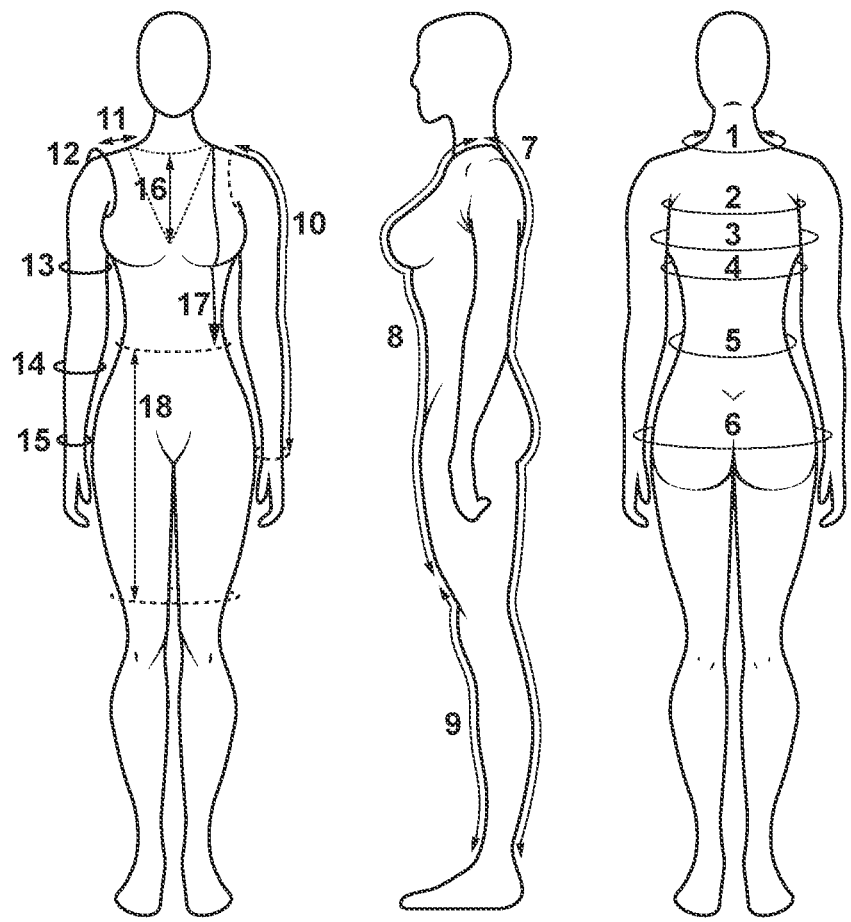
FIG. 8 is a diagram of one illustrative embodiment of example measurement chart.

FIG. 8 is a diagram of one illustrative embodiment of example measurement chart 800. For certain applications, it may be necessary to add additional measurements to enhance the accuracy of the system predictions and to prevent false positive recommendations. This especially applies to complex dresses for adult women. The particular measurements shown are dress/shirt measurements. As shown, the measurements include, for example, neck measurements, overbust measurements, bust measurements, waist measurements, etc.

Figure 9:
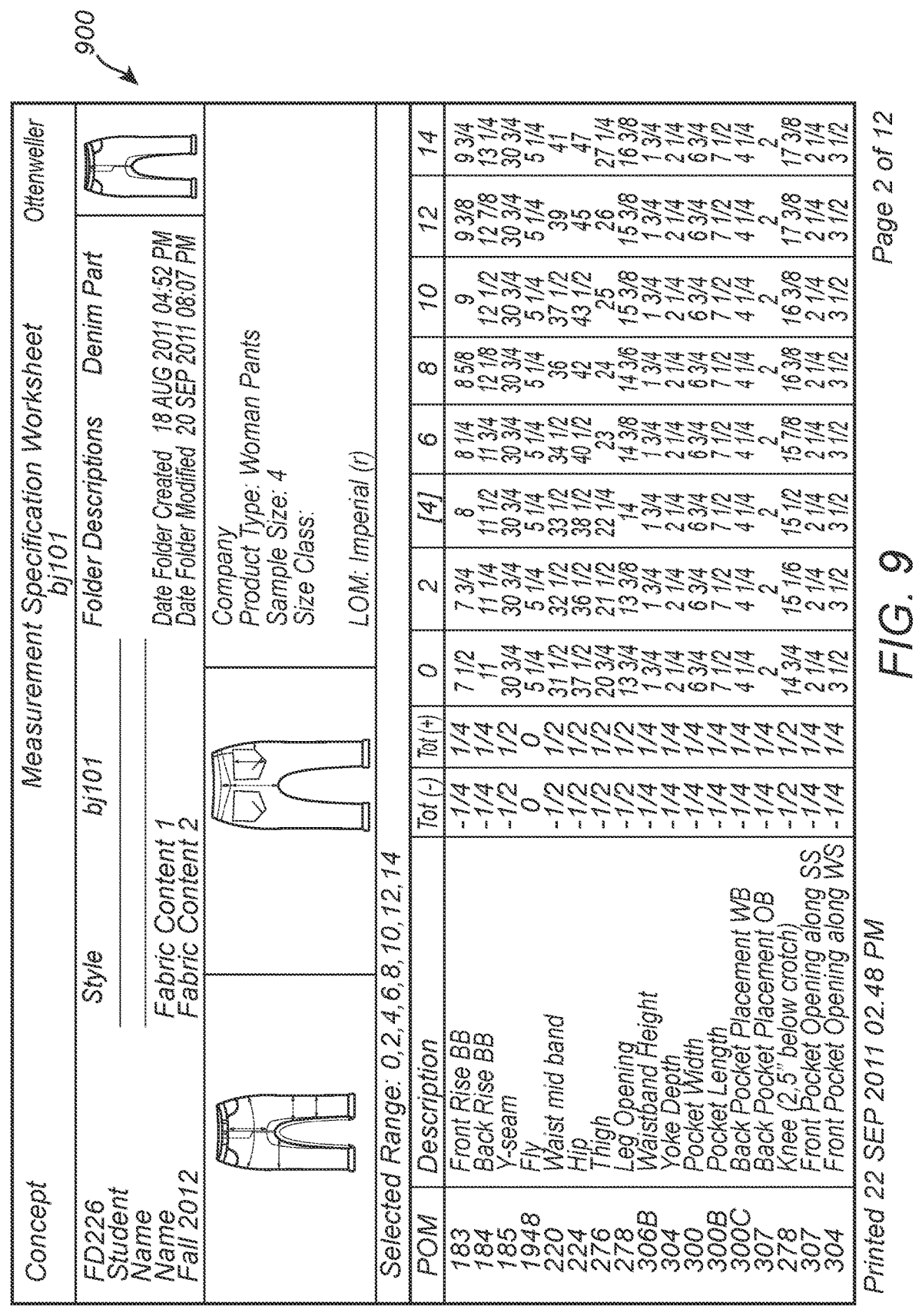

FIG. 9 is a diagram of one illustrative embodiment of example measurement specification worksheet 900. The example measurement specification worksheet 900 may be referred to as a technical sheet or "tech sheet." The tech shows all points of measurement (POMs) for each numbered size. The particular type of garment covered by a tech sheet may vary, and will depend on the particular implementation. For this particular example, the tech sheet is for a pair of pants. The tech sheet may be associated with 2D photographs, binary 3D photographs, 3D Depth Maps, 2D silhouette cross sections, and common tailor measurements (e.g., bust measurements, underbust measurements, waist measurements, and hips measurements, etc.).

FIG. 10 is a diagram of one illustrative embodiment of an example measurement selection worksheet 1000. Shown is a measurement selection worksheet 1000 for an underbust measurement. Similar example measurement selection worksheets may be available all other body measurements such as waist measurement, hip measurement, back waist length measurement, shoulder measurement, bust measurement, etc.

Figure 11:
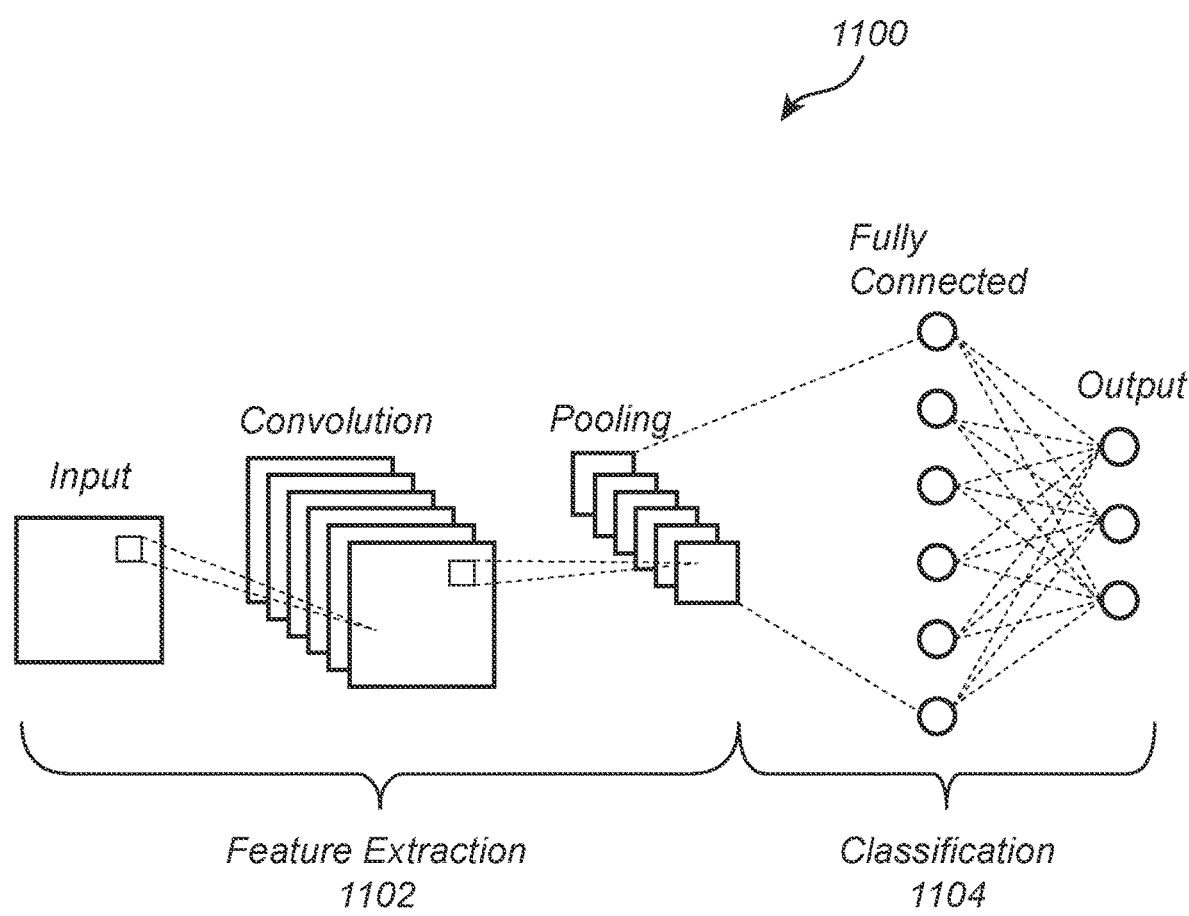
FIG. 11 is a diagram of one illustrative embodiment of example neural network.

FIG. 11 is a diagram of one illustrative embodiment of an example neural network 1100. The neural network 1100 includes feature extraction components 1102 with input, convolution, and pooling elements. The neural network 1100 also includes classification components 1104. With fully connected and output neural network cells. The tailoring platform may utilize the neural network 1100 for implementing embodiments described below and herein.

In various embodiments, the system may maintain and have access to a database of hundreds or thousands of real-world body models and their precise measurements.

built-like body armor or space suits. This can be applied with existing libraries such as NEAT-Python.

The following is an example code for a CNN to detect the hip measurement based on the compressed or uncompressed input image. During the training process, multiple algorithms are applied, accuracy is measured, and the winning algorithm is saved as a model file. This model file is stored on the camera device so that core measurement generation may be performed on the camera device at high speeds using the GPU or AI accelerator chips. GPU and AI accelerator chips may be found on modern smartphones such as the neural engine in the A11 Bionic in the iPhone X and above, or on a Google tensor chip found in pixel phones. The following is an example pseudo code:

```
#import libraries import keras from keras.models import Sequential from
keras.layers import Conv2D, MaxPooling2D, Flatten, Dense #create a model
model = Sequential( ) #add layers model.add(Conv2D(32, (3, 3), activation='relu',
input_shape=(224, 224, 3))) model.add(MaxPooling2D((2, 2)))
model.add(Conv2D(64, (3, 3), activation='relu')) model.add(MaxPooling2D((2,
2))) model.add(Conv2D(128, (3, 3), activation='relu'))
model.add(MaxPooling2D((2, 2))) model.add(Flatten( )) model.add(Dense(128,
activation='relu')) model.add(Dense(1)) #compile the model
model.compile(optimizer='adam', loss='mean_squared_error',
metrics=['accuracy'])
```

This information may be fed into a machine learning model such as a generative adversarial model (GAN), recurrent neural network (RNNs), convolutional neural network (CNN), and/or neuro evolutionary augmented topology (NEATs). This approach applies all methodologies and applies the methodology that performs best for any particular use case. In general, GANs and RNNs work better as the volume and accuracy of data increase. CNNs and NEATs will perform well on smaller datasets with less precision. The following data is fed into the neural network training if and when available. The training process filters and focuses on the factors that matter.

For relatively normal bodies with near-average body mass index (BMI), a simple CNN may be applied. Additional precision is not necessary and is negated by the measurement changing as the person breathes or with the amount of water in the body changes.

Figure 12:
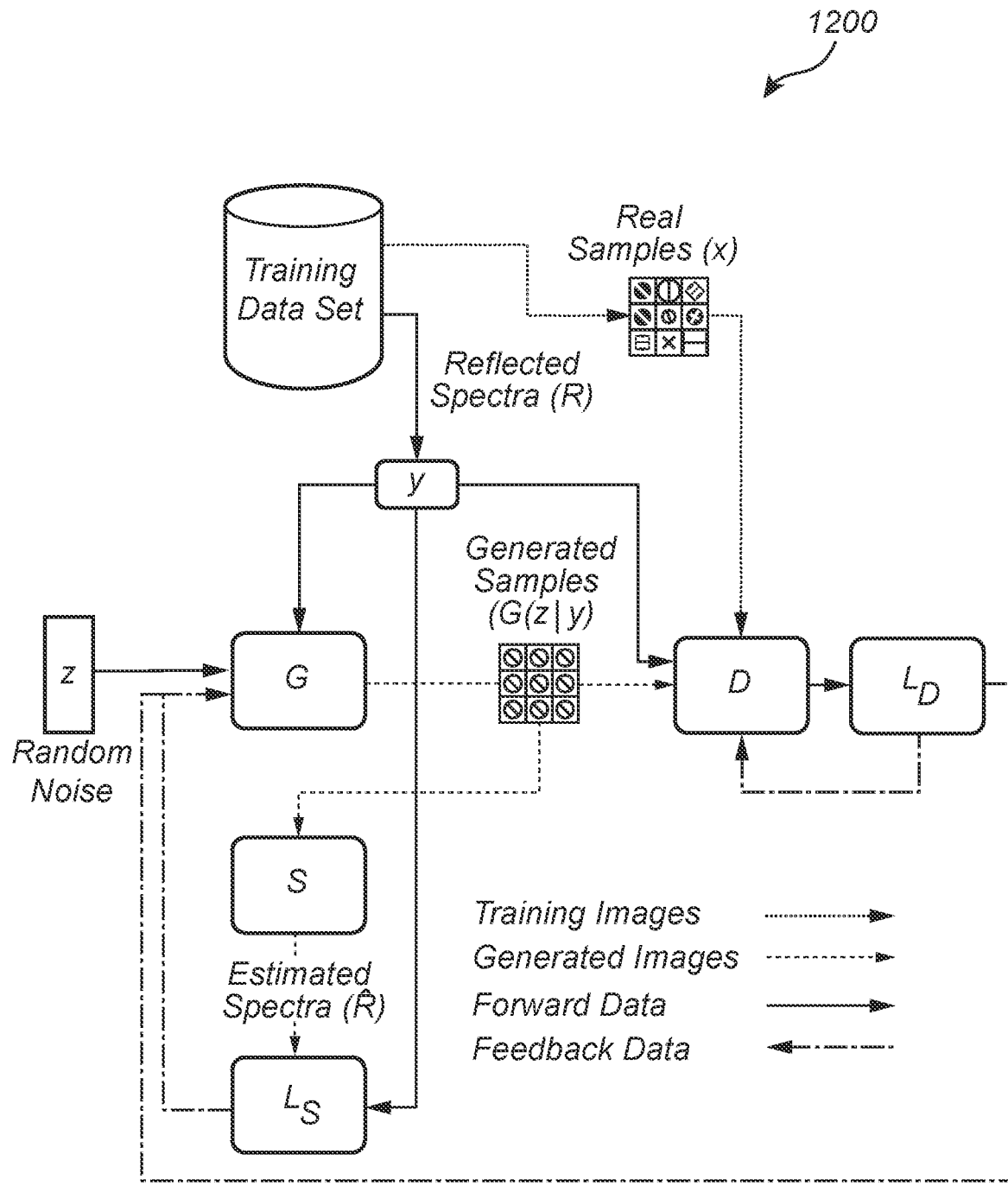
FIG. 12 is a diagram of one illustrative embodiment of example training system.
Figure 13:
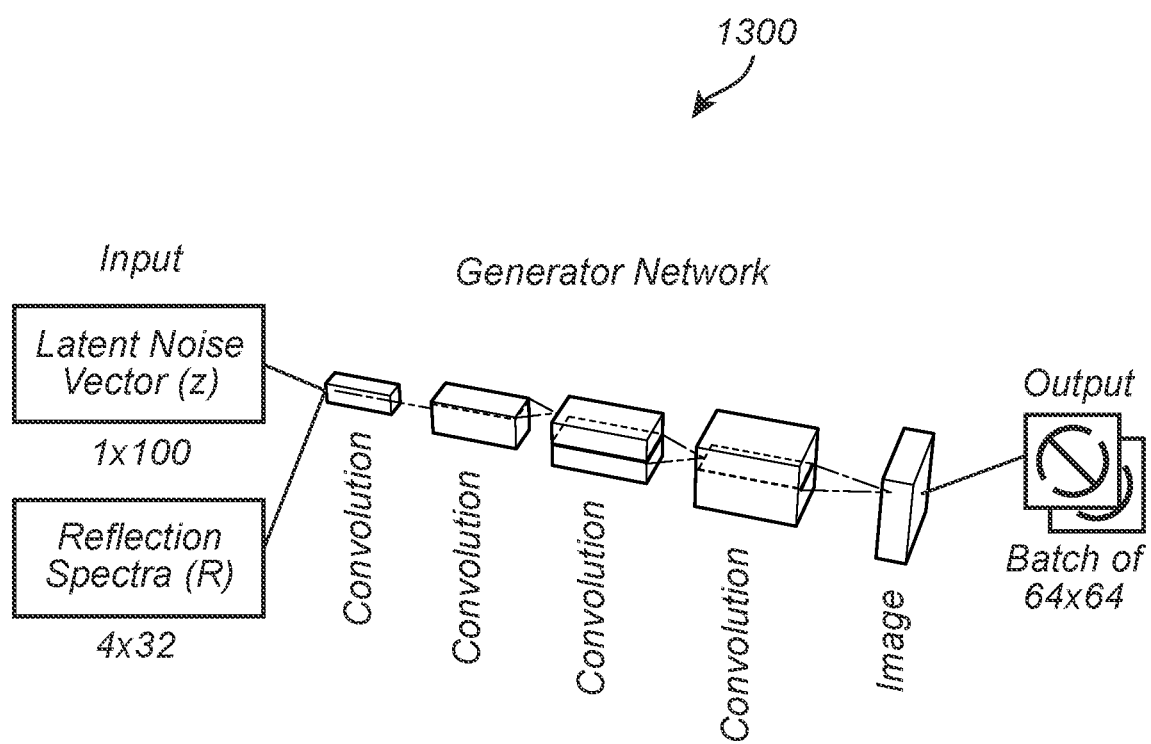
FIG. 13 is a diagram of one illustrative embodiment of example generator network.
Figure 14:
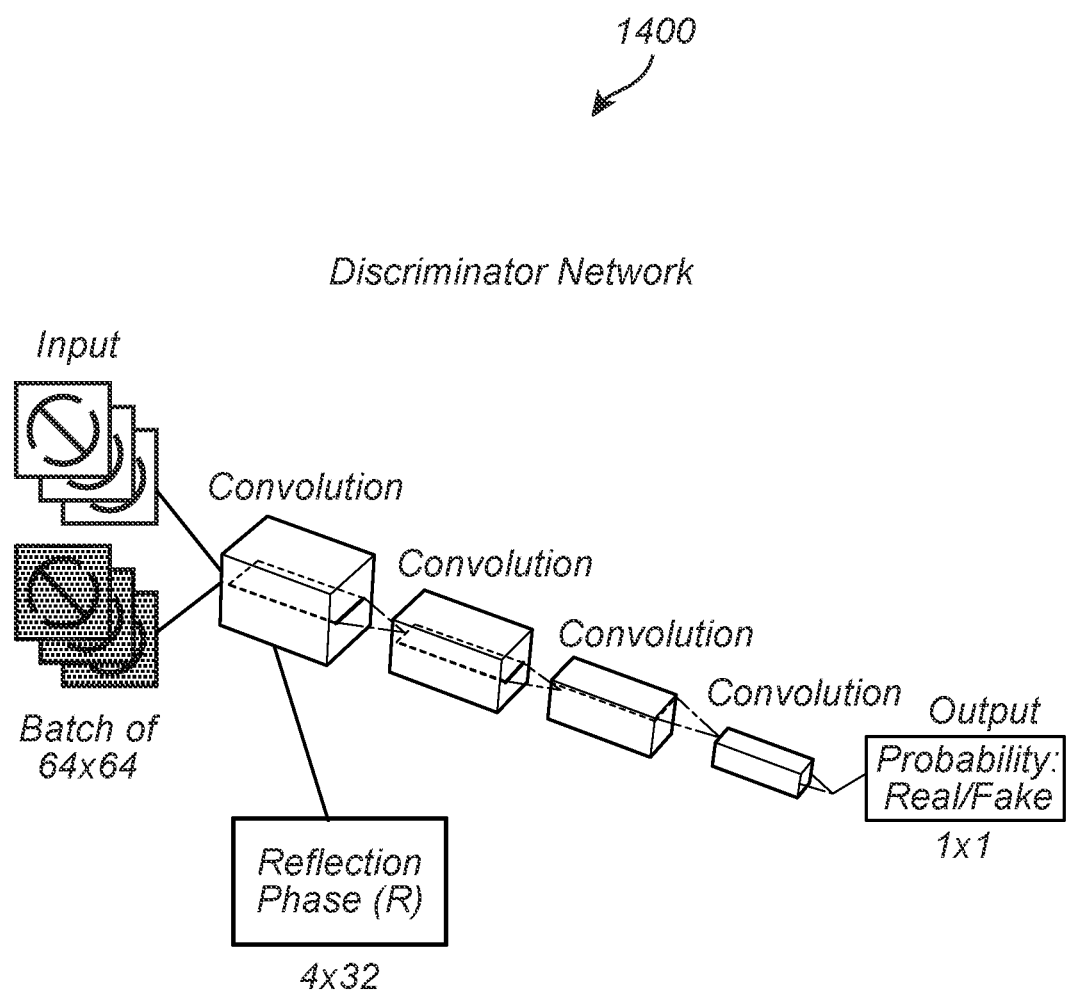
FIG. 14 is a diagram of one illustrative embodiment of example discriminator network.
Figure 15:
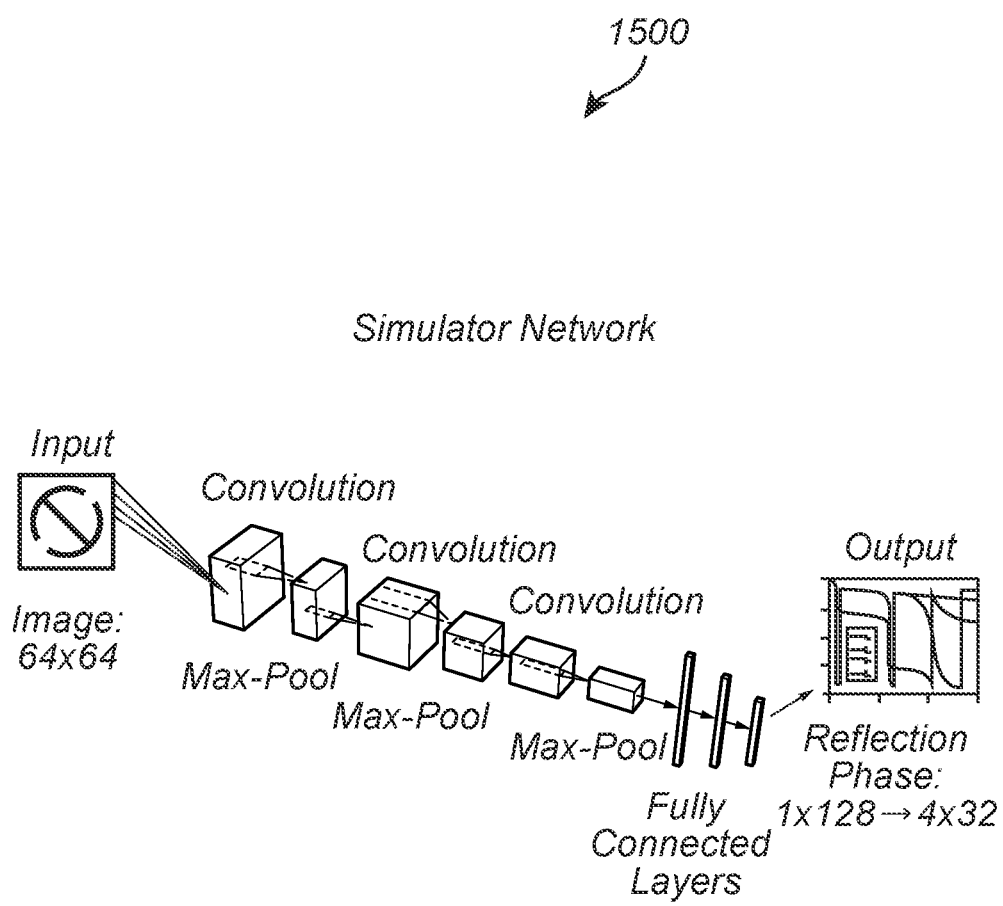
FIG. 15 is a diagram of one illustrative embodiment of example simulator network.

FIG. 12 is a diagram of one illustrative embodiment of an example training system 1200. FIG. 13 is a diagram of one illustrative embodiment of an example generator network 1300. FIG. 14 is a diagram of one illustrative embodiment of an example discriminator network 1400. FIG. 15 is a diagram of one illustrative embodiment of an example simulator network 1500.

For very complex body types, the system may use a more complex GAN or RNN for prediction. These types of models may require far greater levels of high-quality data to work. The tailoring platform may utilize the training system and networks of FIGS. 12 to 15 for training and implementing such models.

Figure 16:
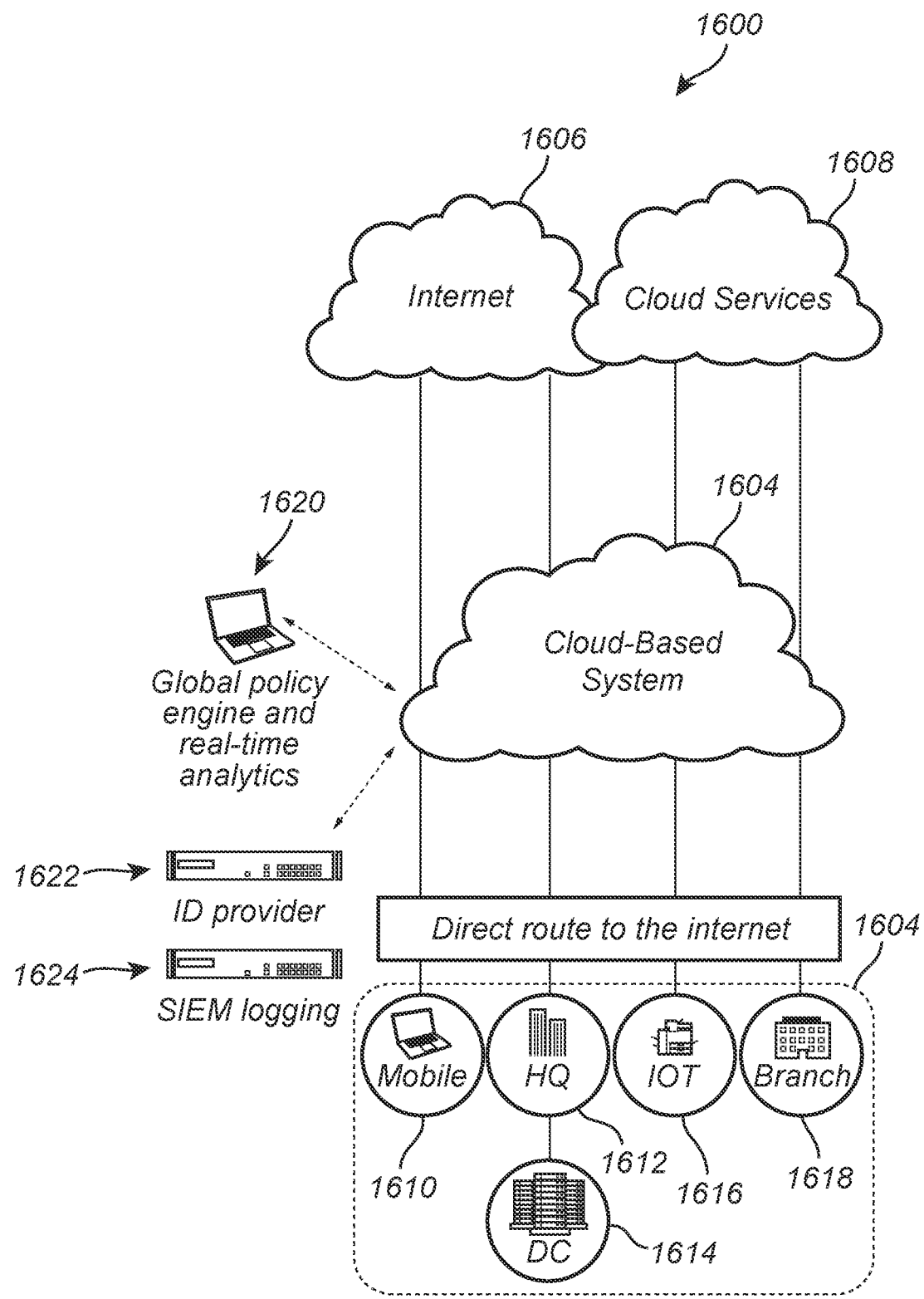
FIG. 16 is a diagram of one illustrative embodiment of an example cloud-based system environment.

In various embodiments, the use of a NEAT would achieve a balance between the extremes of the simplicity of a CNN and the complexity of a GAN. A NEAT is a method for evolving artificial neural networks with a genetic algorithm. A NEAT implements the idea that it is most effective to start evolution with small, simple networks, and allows these networks to become increasingly complex over generations. This approach may dynamically apply the appropriate depth architecture to each measurement and may be used for very complex garments that have to be custom- FIG. 16 is a diagram of one illustrative embodiment of an example cloud-based system environment 1600. Specifically, the cloud-based system 1602 offers a secure internet and web gateway as a service to various users 1604, as well as other cloud services. In this manner, the cloud-based system 1602 is located between the users 1604 and the internet 1606, as well as any cloud services 1608 (or applications) accessed by the users 1604. As such, the cloud-based system 1602 provides inline monitoring inspecting traffic between the users 1604, the internet 1606, and the cloud services 1608, including secure sockets layer (SSL) traffic. The cloud-based system 1602 may offer access control, threat prevention, data protection, etc. The access control can include a cloud-based firewall, cloud-based intrusion detection, uniform resource locator (URL) filtering, bandwidth control, domain name system (DNS) filtering, etc. Threat prevention can include cloud-based intrusion prevention, protection against advanced threats (malware, spam, cross-site scripting (XSS), phishing, etc.), cloud-based sandbox, antivirus, DNS security, etc. The data protection can include data loss prevention (DLP), cloud application security such as via a cloud access security broker (CASB), file type control, etc.

For illustration purposes, the users 1604 of the cloud-based system 1602 can include a mobile device 1610, a headquarters (HQ) 1612 which can include or connect to a data center (DC) 1614, internet of things (IoT) devices 1616, a branch office/remote location 1618, etc., and each includes one or more user devices such an example user device 300 user equipment (UE) (illustrated in FIG. 4). The devices 1610 and 1616, and the locations 1612, 1614, and 1618 are shown for illustrative purposes. Those skilled in the art will recognize that there may be various access scenarios and other users associated with the cloud-based system 1602, all of which are contemplated herein. The user 1604 can be associated with a tenant, which may include an enterprise, a corporation, an organization, etc. That is, a tenant is a group of users who share common access with specific privileges to the cloud-based system 1602, a cloud service, etc. In an embodiment, the headquarters 1612 can include an enterprise's network with resources in the data center 1614. The mobile device 1610 can be a so-called road warrior, e.g., users that are off-site, on the road, etc. Those skilled in the art will recognize that a user 1604 has to use a corresponding user device 300 for accessing the cloud-based system 1602 and the like and that the description herein may use the user 1604 and/or the user device 300 interchangeably.

Logically, the cloud-based system 1602 can be viewed as an overlay network between users (at the locations 1612, 1614, and 1618, and the devices 1610 and 1616) and the internet 1606 and the cloud services 1608. As an ever-present overlay network, the cloud-based system 1602 can provide the same functions as the physical devices and/or appliances regardless of geography or location of the users 1604, as well as independent of platform, operating system, network access technique, network access provider, etc.

There are various techniques to forward traffic between the users 1604 at the locations 1612, 1614, and 1618, and via the devices 1610 and 1616, and the cloud-based system 1602. Typically, locations 1612, 1614, and 1618 can use tunneling where all traffic is forwarded through the cloud-based system 1602. For example, various tunneling protocols are contemplated, such as general routing encapsulation (GRE), layer 2 tunneling protocol (L2TP), internet protocol security (IPsec), customized tunneling protocols, etc. The devices 1610 and 1616, when not at one of the locations 1612, 1614, and 1618 can use a local application that forwards traffic, a proxy auto-config (PAC) file, and the like. The local application may be referred to as a connector application. A key aspect of the cloud-based system 1602 is that all traffic between the users 1604 and the internet 1606 or the cloud services 1608 passes via the cloud-based system 1602. As such, the cloud-based system 1602 has visibility to enable various functions, all of which are performed off the user device in the cloud.

The cloud-based system 1602 can also include a management system 1620 for tenant access to provide global policy and configuration as well as real-time analytics. The cloud-based system 1602 can further include connectivity to an identity provider (IDP) 1622 for authentication of the users 1604 and to a security information and event management (STEM) system 1624 for event logging. The system 1624 can provide alert and activity logs on a per-user 1604 basis.

Figure 17:
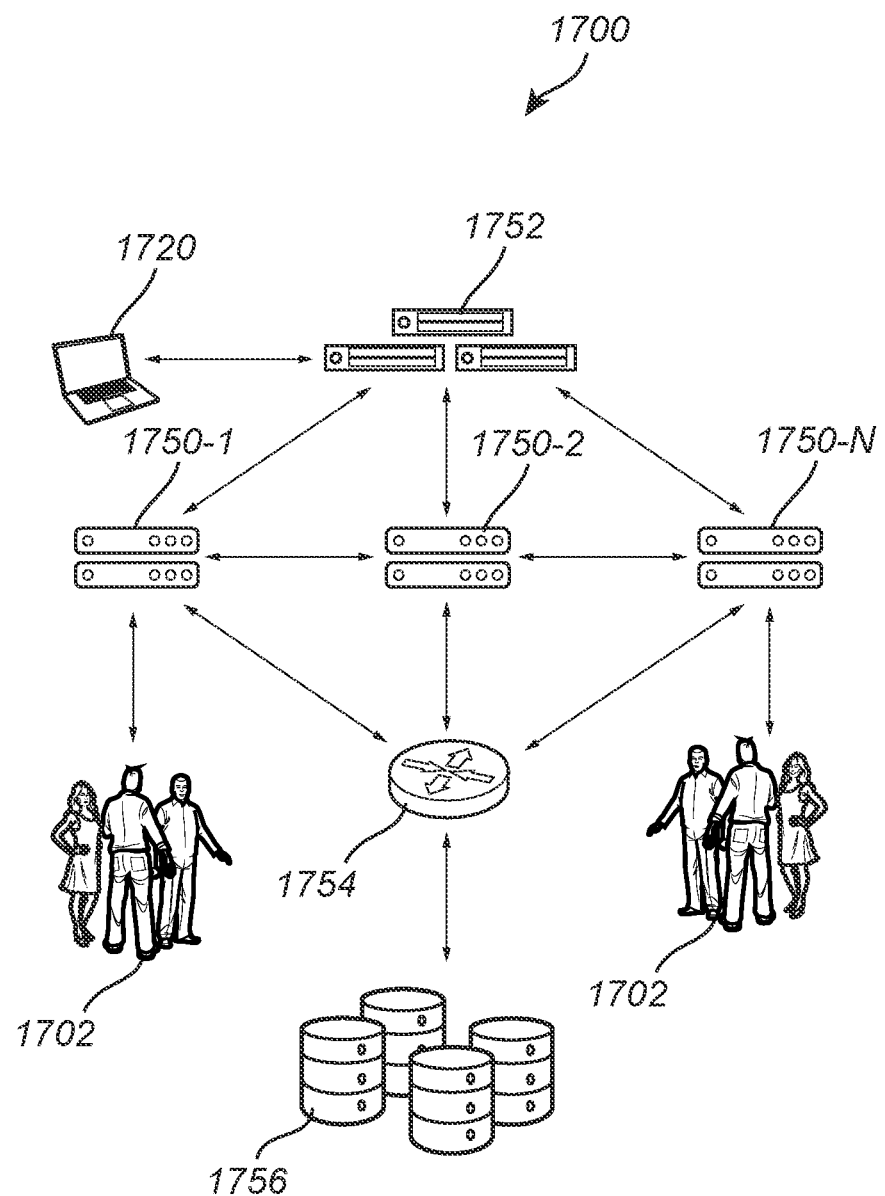
FIG. 17 is a network diagram of one illustrative embodiment of an example implementation of a cloud-based system.
Figure 18:
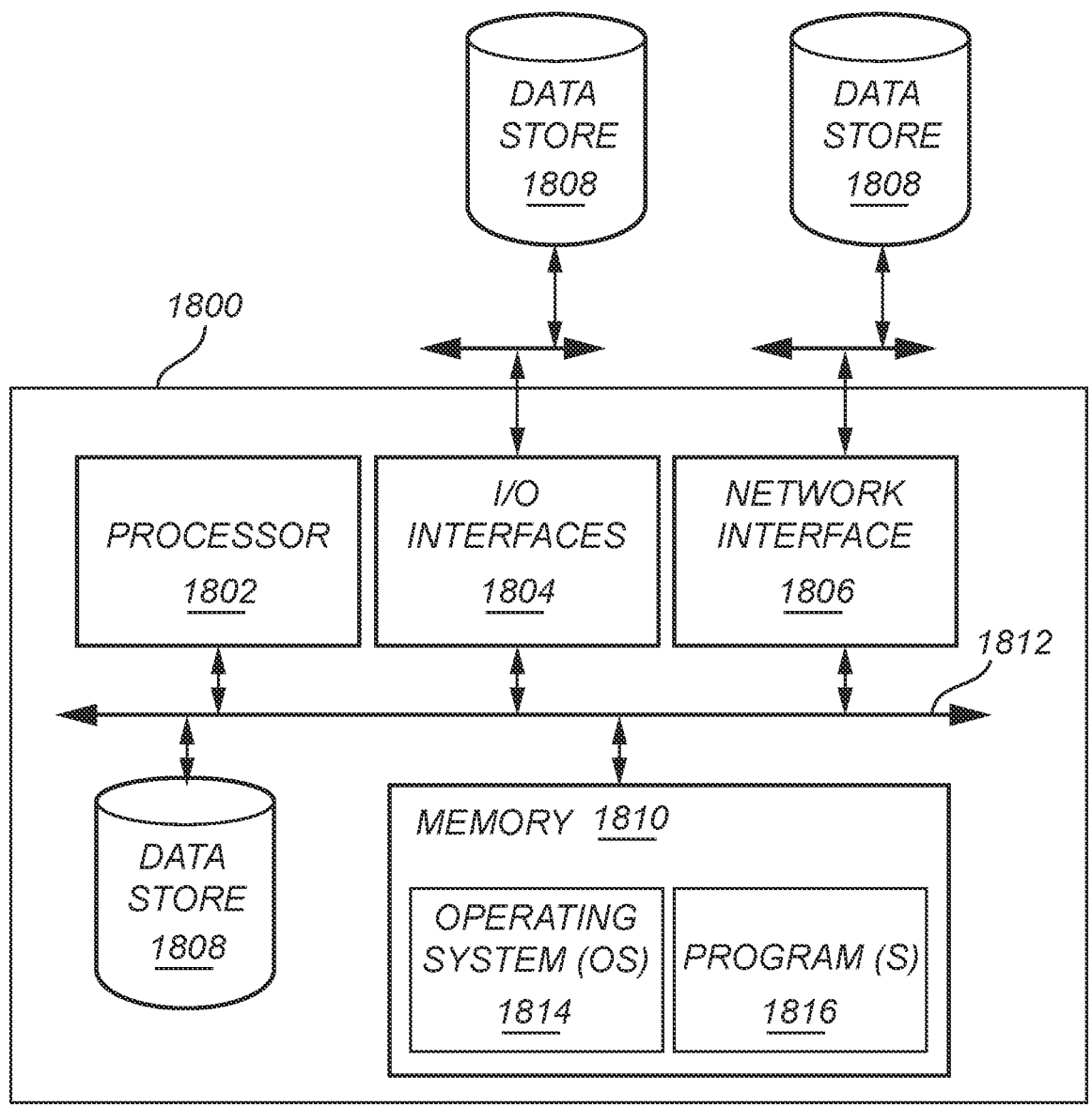
FIG. 18 is a block diagram of one illustrative embodiment of an example server, which may be used in a cloud-based system.

FIG. 17 is a network diagram of one illustrative embodiment of an example implementation of a cloud-based system 1700. In an embodiment, the cloud-based system 1700 includes a plurality of enforcement nodes (EN) 1750, labeled as enforcement nodes 1750-1, 1750-2, 1750-N, interconnected to one another and interconnected to a central authority (CA) 1752. Note, the nodes 1750 are called "enforcement" nodes 1750, but they can be simply referred to as nodes 1750 in the cloud-based system 1700. Also, the nodes 1750 can be referred to as service edges. The nodes 1750 and the central authority 1752, while described as nodes, can include one or more servers, including physical servers, virtual machines (VM) executed on physical hardware, etc. An example of a server is illustrated in FIG. 18. The cloud-based system 1700 further includes a log router 1754 that connects to a storage cluster 1756 for supporting log maintenance from the enforcement nodes 1750. The central authority 1752 provides centralized policy, real-time threat updates, etc. and also coordinates the distribution of this data between the enforcement nodes 1750. The enforcement nodes 1750 provide an onramp to the users 1702 and are configured to execute policy, based on the central authority 1752, for each user 1702. The enforcement nodes 1750 can be geographically distributed, and the policy for each user 1702 follows that user 1702 as he or she connects to the nearest (or other criteria) enforcement node 1750. Of note, the cloud-based system is an external system meaning it is separate from the tenant's private networks (enterprise networks) as well as from networks associated with the devices 1610 and 1616, and locations 1612 and 1618 (FIG. 16).

The enforcement nodes 1750 are full-featured secure internet gateways that provide integrated internet security. They inspect all web traffic bi-directionally for malware and enforce security, compliance, and firewall policies, as described herein, as well as various additional functionality. In an embodiment, each enforcement node 1750 has two main modules for inspecting traffic and applying policies: a web module and a firewall module. The enforcement nodes 1750 are deployed around the world and can handle hundreds of thousands of concurrent users with millions of concurrent sessions. Because of this, regardless of where the users 1702 are, they can access the internet 1704 from any device, and the enforcement nodes 1750 protect the traffic and apply corporate policies. The enforcement nodes 1750 can implement various inspection engines therein, and optionally, send sandboxing to another system. The enforcement nodes 1750 include significant fault tolerance capabilities, such as deployment in active-active mode to ensure availability and redundancy as well as continuous monitoring.

The central authority 1752 hosts all customer (tenant) policy and configuration settings. It monitors the cloud and provides a central location for software and database updates and threat intelligence. Given the multi-tenant architecture, the central authority 1752 is redundant and backed up in multiple different data centers. The enforcement nodes 1750 establish persistent connections to the central authority 1752 to download all policy configurations. When a new user connects to an enforcement node 1750, a policy request is sent to the central authority 1752 through this connection. The central authority 1752 then calculates the policies that apply to that user 1702 and sends the policy to the enforcement node 1750 as a highly compressed bitmap.

The cloud-based system 1700 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition that states cloud computing is a model for enabling convenient, on-demand network access to a shared pool of configurable computing resources (e.g., networks, servers, storage, applications, services, etc.) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 1700 is illustrated herein as an example embodiment of a cloud-based system, and other implementations are also contemplated.

As described herein, the terms cloud services and cloud applications may be used interchangeably. The cloud service 1706 is any service made available to users on-demand via the internet, as opposed to being provided from a company's on-premises servers. A cloud application, or cloud app, is a software program where cloud-based and local components work together.

FIG. 18 is a block diagram of one illustrative embodiment of an example server 1800, which may be used in the cloud-based system 100, in other systems, or standalone. For example, the enforcement nodes 150 and central authority (not shown) may be formed as one or more of the servers 1800. The server 1800 may be a digital computer that, in terms of hardware architecture, generally includes a processor 1802, input/output (I/O) interfaces 1804, a network interface 1806, data stores 1808, and memory 1810. It should be appreciated by those of ordinary skill in the art that FIG. 18 depicts the server 1800 in an oversimplified manner, and a practical embodiment may include additional components and suitably configured processing logic to support known or conventional operating features that are not described in detail herein. The components (1802, 1804, 1806, 1808, and 1810) are communicatively coupled via a local interface 1812. The local interface 1812 may be, for example, but not limited to, one or more buses or other wired or wireless connections, as is known in the art. The local interface 1812 may have additional elements, which are omitted for simplicity, such as controllers, buffers (caches), drivers, repeaters, and receivers, among many others, to enable communications. Further, the local interface 1812 may include address, control, and/or data connections to enable appropriate communications among the aforementioned components.

The processor 1802 is a hardware device for executing software instructions. The processor 1802 may be any custom made or commercially available processor, a central processing unit (CPU), an auxiliary processor among several processors associated with the server 1800, a semiconductor-based microprocessor (in the form of a microchip or chipset), or generally any device for executing software instructions. When the server 1800 is in operation, the processor 1802 is configured to execute software stored within the memory 1810, to communicate data to and from the memory 1810, and to generally control operations of the server 1800 pursuant to the software instructions. The I/O interfaces 1804 may be used to receive user input from and/or for providing system output to one or more devices or components.

The network interface 1806 may be used to enable the server 1800 to communicate on a network, such as the internet. The network interface 1806 may include, for example, an ethernet card or adapter or a wireless local area network (WLAN) card or adapter. The network interface 1806 may include address, control, and/or data connections to enable appropriate communications on the network. The data stores 1808 may be used to store data. The data stores 1808 may include any of volatile memory elements such as a random-access memory (RAM), a dynamic random-access memory (DRAM), a static random-access memory (SRAM), a synchronous dynamic random-access memory (SDRAM), and the like, nonvolatile memory elements such as a read-only memory (ROM), a hard drive, a tape, a compact disc read-only memory (CDROM), and the like, and/or combinations thereof.

Moreover, the data stores 1808 may incorporate electronic, magnetic, optical, and/or other types of storage media. In one example, the data stores 1808 may be located internal to the server 1800, such as, for example, an internal hard drive connected to the local interface 1812 in the server 1800. Additionally, in another embodiment, the data stores 1808 may be located external to the server 1800 such as, for example, an external hard drive connected to the I/O interfaces 1804, such as a small computer system interface (SCSI) or a universal serial bus (USB) connection. In a further embodiment, the data stores 1808 may be connected to the server 1800 through a network, such as, for example, a network-attached file server.

The memory 1810 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1810 may incorporate electronic, magnetic, optical, and/or other types of storage media. Note that the memory 1810 may have a distributed architecture, where various components are situated remotely from one another but can be accessed by the processor 1802. The software in memory 1810 may include one or more software programs, each of which includes an ordered listing of executable instructions for implementing logical functions. The software in the memory 1810 includes a suitable operating system (O/S) 1814 and one or more programs 1816. The operating system 1814 essentially controls the execution of other computer programs, such as the one or more programs 1816, and provides scheduling, input-output control, file and data management, memory management, and communication control and related services. The one or more programs 1816 may be configured to implement the various processes, algorithms, methods, techniques, etc. described herein.

Figure 19:
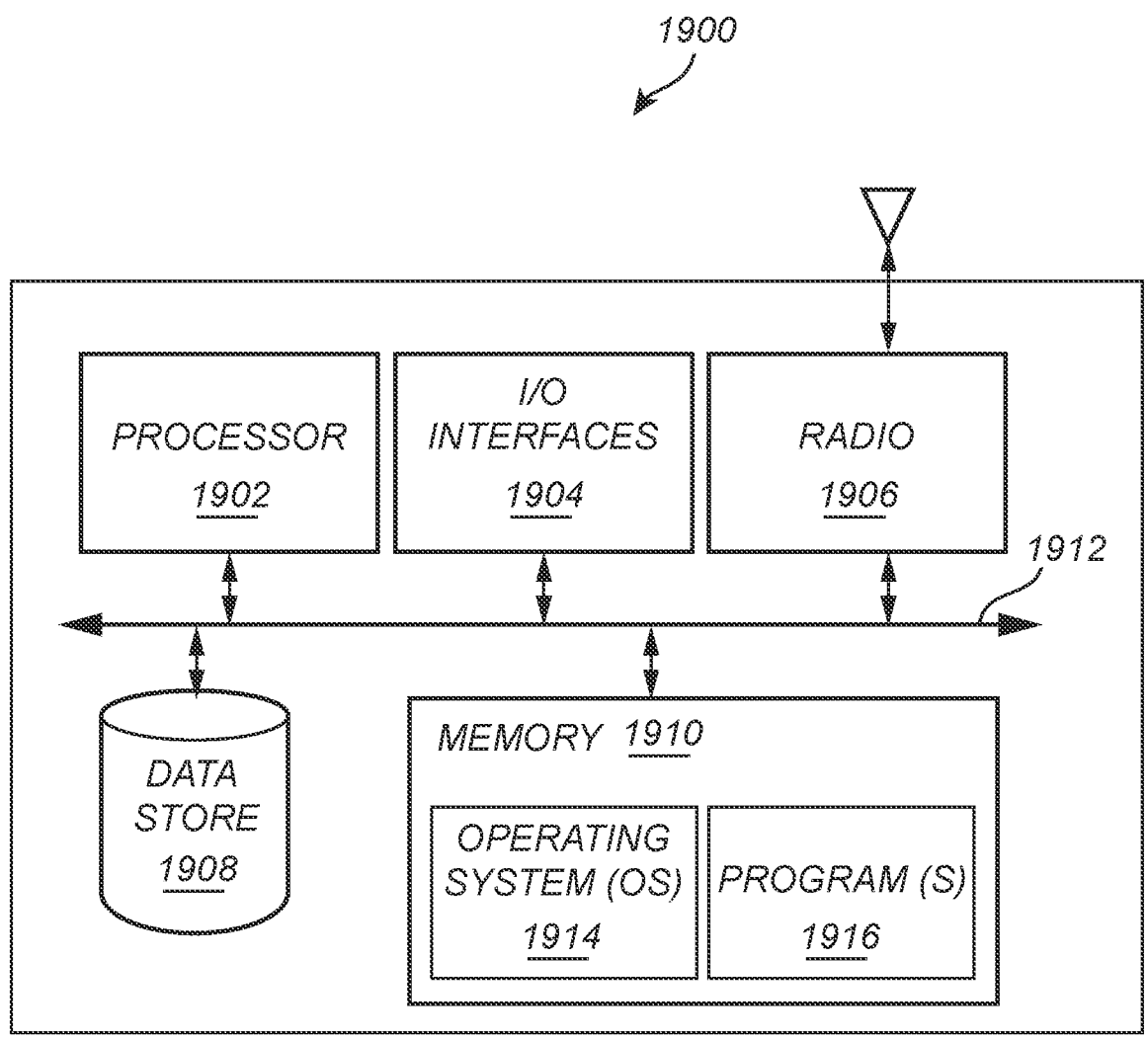
FIG. 19 is a block diagram of one illustrative embodiment of an example user device, which may be used with a cloud-based system.

FIG. 19 is a block diagram of one illustrative embodiment of an example user device 1900, which may be used with the cloud-based system 100 or the like. Specifically, the user device 1900 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 1900 can be a digital device that, in terms of hardware architecture, generally includes a processor 1902, I/O interfaces 1904, a network interface 1906, a data store 1908, and memory 1910. It should be appreciated by those of ordinary skill in the art that FIG. 19 depicts the user device 1900 in an oversimplified manner, and a practical embodiment may include additional components and suitably configured processing logic to support known or conventional operating features that are not described in detail herein. The components (1902, 1904, 1906, 1908, and 1910) are communicatively coupled via a local interface 1912. The local interface 1912 can be, for example, but not limited to, one or more buses or other wired or wireless connections, as is known in the art. The local interface 1912 can have additional elements, which are omitted for simplicity, such as controllers, buffers (caches), drivers, repeaters, and receivers, among many others, to enable communications. Further, the local interface 1912 may include address, control, and/or data connections to enable appropriate communications among the aforementioned components.

The processor 1902 is a hardware device for executing software instructions. The processor 1902 can be any custom made or commercially available processor, a CPU, an auxiliary processor among several processors associated with the user device 1900, a semiconductor-based microprocessor (in the form of a microchip or chipset), or generally any device for executing software instructions. When the user device 1900 is in operation, the processor 1902 is configured to execute software stored within the memory 1910, to communicate data to and from the memory 1910, and to generally control operations of the user device 1900 pursuant to the software instructions. In an embodiment, the processor 1902 may include a mobile optimized processor such as optimized for power consumption and mobile applications. The I/O interfaces 1904 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The network interface 1906 enables wireless communication to an external access device or network. Any number of suitable wireless data communication protocols, techniques, or methodologies can be supported by the network interface 1906, including any protocols for wireless communication. The data store 1908 may be used to store data. The data store 1908 may include any of volatile memory elements, such as random-access memory (RAM), such as DRAM, SRAM, SDRAM, and the like), nonvolatile memory elements (e.g., ROM, hard drive, tape, CDROM, and the like), and combinations thereof. Moreover, the data store 1908 may incorporate electronic, magnetic, optical, and/or other types of storage media.

The memory 1910 may include any of the volatile memory elements, such as RAM (e.g., DRAM, SRAM, SDRAM, etc.), nonvolatile memory elements (e.g., ROM, hard drive, etc.), and combinations thereof. Moreover, the memory 1910 may incorporate electronic, magnetic, optical, and/or other types of storage media. Note that the memory 1910 may have a distributed architecture, where various components are situated remotely from one another but can be accessed by the processor 1902. The software in memory 1910 can include one or more software programs, each of which includes an ordered listing of executable instructions for implementing logical functions. In the example of FIG. 4, the software in the memory 1910 includes a suitable operating system 1914 and program(s) 1916. The operating system 1914 essentially controls the execution of other computer programs and provides scheduling, input-output control, file and data management, memory management, and communication control and related services. The programs 1916 may include various applications, add-ons, etc. configured to provide end user functionality with the user device 1900. For example, example programs 1916 may include, but not limited to, a web browser, social networking applications, streaming media applications, games, mapping and location applications, electronic mail applications, financial applications, and the like. In a typical example, the end-user typically uses one or more of the programs 1916 along with a network such as the cloud-based system 100.

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), flash memory, and the like. When stored in the non-transitory computer-readable medium, the software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

Although the present disclosure is illustrated and described herein with reference to illustrative embodiments and specific examples of the tailoring platform provided, it will be readily apparent to those of ordinary skill in the art that other embodiments and examples may perform similar functions and/or achieve like results. All such equivalent embodiment and examples are within the spirit and scope of the present disclosure and are intended to be covered by the following non-limiting claims for all purposes.

What is claimed is:

1. A system comprising:
   one or more processors; and
   logic encoded in one or more non-transitory computer-readable storage media for execution by the one or more processors and when executed operable to cause the one or more processors to perform operations comprising:

scanning a body of a user using a camera device, wherein the scanning captures images of the body from a predetermined pattern of perspectives;
computing one or more depth maps of the body based on the movement of the camera device;
constructing a three-dimensional (3D) point cloud that models the body based at least in part on the one or more depth maps;
modifying the 3D point cloud to obscure identifying information of the user; and
identifying candidate garments for the user based on the 3D point cloud and one or more garment selection policies.

2. The system of claim 1, wherein the predetermined pattern of perspectives comprises a circular pattern.

3. The system of claim 1, wherein the logic when executed is further operable to cause the one or more processors to perform operations comprising generating the one or more depth maps of the body using light detection and ranging (LiDAR).

4. The system of claim 1, wherein the logic when executed is further operable to cause the one or more processors to perform operations comprising generating the one or more depth maps of the body using dual cameras of the camera device.

5. The system of claim 1, wherein the logic when executed is further operable to cause the one or more processors to perform operations comprising discarding the images after a predetermined moment based on one or more privacy policies.

6. The system of claim 1, wherein the logic when executed is further operable to cause the one or more processors to perform operations comprising:
generating silhouettes of the body based on the 3D point cloud; and
predicting core measurements of the user based on the silhouettes.

7. The system of claim 1, wherein the logic when executed is further operable to cause the one or more processors to perform operations comprising generating a neural radiance field (NERF) model based on the images of the body captured by the scanning, and wherein the constructing of the 3D point cloud that models the body is based at least in part on the NERF model.

8. The system of claim 1, wherein modifying the 3D point cloud to obscure identifying information of the user comprises removing a portion of the 3D point cloud representing a face of the user.

9. A non-transitory computer-readable storage medium with program instructions stored thereon, the program instructions when executed by one or more processors are operable to cause the one or more processors to perform operations comprising:
scanning a body of a user using a camera device, wherein the scanning captures images of the body from a predetermined pattern of perspectives;
computing one or more depth maps of the body based on the movement of the camera device;
constructing a three-dimensional (3D) point cloud that models the body based at least in part on the one or more depth maps;
modifying the 3D point cloud to obscure identifying information of the user; and
identifying candidate garments for the user based on the 3D point cloud and one or more garment selection policies.

10. The computer-readable storage medium of claim 9, wherein the predetermined pattern of perspectives comprises a circular pattern.

11. The computer-readable storage medium of claim 9, wherein the instructions when executed are further operable to cause the one or more processors to perform operations comprising generating the one or more depth maps of the body using light detection and ranging (LiDAR).

12. The computer-readable storage medium of claim 9, wherein the instructions when executed are further operable to cause the one or more processors to perform operations comprising generating the one or more depth maps of the body using dual cameras of the camera device.

13. The computer-readable storage medium of claim 9, wherein the instructions when executed are further operable to cause the one or more processors to perform operations comprising discarding the images after a predetermined moment based on one or more privacy policies.

14. The computer-readable storage medium of claim 9, wherein the instructions when executed are further operable to cause the one or more processors to perform operations comprising:
generating silhouettes of the body based on the 3D point cloud; and
predicting core measurements of the user based on the silhouettes.

15. The computer-readable storage medium of claim 9, wherein the instructions when executed are further operable to cause the one or more processors to perform operations comprising generating a neural radiance field (NERF) model based on the images of the body captured by the scanning, and wherein the constructing of the 3D point cloud that models the body is based at least in part on the NERF model.

16. A computer-implemented method comprising:
scanning a body of a user using a camera device, wherein the scanning captures images of the body from a predetermined pattern of perspectives;
computing one or more depth maps of the body based on movement of the camera device;
constructing a three-dimensional (3D) point cloud that models the body based at least in part on the one or more depth maps;
modifying the 3D point cloud to obscure identifying information of the user; and
identifying candidate garments for the user based on the 3D point cloud and one or more garment selection policies.

17. The method of claim 16, further comprising generating one or more depth maps of the body using light detection and ranging (LiDAR).

18. The method of claim 16, further comprising generating the one or more depth maps of the body using dual cameras of the camera device, and wherein the construction of the 3D point cloud that models the body is based at least in part on the one or more depth maps.

19. The method of claim 16, further comprising discarding the images after a predetermined moment based on one or more privacy policies.

20. The method of claim 16, further comprising:
generating silhouettes of the body based on the 3D point cloud; and
predicting core measurements of the user based on the silhouettes.

* * * * *